United States Patent
Hoffmann et al.

(10) Patent No.: US 11,681,686 B1
(45) Date of Patent: *Jun. 20, 2023

(54) SYSTEMS AND METHODS TO FULLY PROCESS AN INITIALLY INCOMPLETE REPLICATED AND COMMITTED TRANSACTION

(71) Applicant: Gravic, Inc., Malvern, PA (US)

(72) Inventors: John R. Hoffmann, Kennett Square, PA (US); Bruce D. Holenstein, Media, PA (US); Paul J. Holenstein, Downingtown, PA (US)

(73) Assignee: GRAVIC, INC., Malvern, PA (US)

(*) Notice: Subject to any disclaimer, the term of this patent is extended or adjusted under 35 U.S.C. 154(b) by 182 days.

This patent is subject to a terminal disclaimer.

(21) Appl. No.: 16/904,687

(22) Filed: Jun. 18, 2020

Related U.S. Application Data

(63) Continuation of application No. 14/619,804, filed on Feb. 11, 2015, now Pat. No. 10,706,041.

(51) Int. Cl.
*G06F 16/23* (2019.01)
*G06F 16/27* (2019.01)
*G06F 16/28* (2019.01)

(52) U.S. Cl.
CPC .......... *G06F 16/2379* (2019.01); *G06F 16/27* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 5,907,848 A * | 5/1999 | Zaiken | G06Q 40/08 |
| 7,051,051 B1 * | 5/2006 | Stegelmann | G06F 11/1474 |

(Continued)

OTHER PUBLICATIONS

Laura Balzano; Online identification and tracking of subspaces from highly incomplete information; 2010; IEEE;704-711 (Year: 2010).*

(Continued)

*Primary Examiner* — Albert M Phillips, III
*Assistant Examiner* — Jermaine A Mincey
(74) *Attorney, Agent, or Firm* — Clark A. Jablon

(57) ABSTRACT

Methods and apparatus are provided to fully process an initially incomplete replicated and committed transaction. A transaction pattern table is provided that includes a plurality of records, each record being defined by a transaction pattern identifier. Each record includes a transaction pattern and a metric of occurrence of the transaction pattern. An incomplete transaction is automatically compared to the transaction patterns in the table and a subset of transaction patterns in the table are identified that are potential candidates for matching the incomplete transaction. The incomplete transaction is categorized using the metric of occurrence of the transaction pattern for each transaction pattern in the subset. The categorization predicts when all steps or operations of the transaction which have completed in the source database have been replicated, and the incomplete transaction is committed based on this prediction. Any additional steps or operations which have completed in the source database for the committed incomplete transaction are processed as a new transaction applied to the target database, thereby fully processing the incomplete transaction.

18 Claims, 23 Drawing Sheets

(56) References Cited

U.S. PATENT DOCUMENTS

| | | | |
|---|---|---|---|
| 8,126,848 B2 | 2/2012 | Wagner | |
| 8,903,779 B1 | 12/2014 | Holenstein et al. | |
| 8,909,604 B1* | 12/2014 | Holenstein .......... | G06F 11/1469 |
| | | | 707/678 |
| 2008/0275834 A1 | 11/2008 | Zhong et al. | |
| 2009/0240664 A1 | 9/2009 | Dinker et al. | |
| 2010/0042626 A1* | 2/2010 | Verma ................. | G06F 16/1865 |
| | | | 707/E17.107 |
| 2010/0145909 A1 | 6/2010 | Ngo | |
| 2011/0246421 A1* | 10/2011 | Takahashi ............. | G06Q 10/06 |
| | | | 707/E17.014 |
| 2013/0166855 A1* | 6/2013 | Batwara ................ | G06F 3/0659 |
| | | | 711/154 |
| 2013/0339326 A1 | 12/2013 | Greiner et al. | |
| 2014/0143206 A1 | 5/2014 | Pittelko | |
| 2015/0066987 A1 | 3/2015 | Nelke et al. | |
| 2015/0170055 A1 | 6/2015 | Beymer et al. | |
| 2015/0212852 A1 | 7/2015 | Gschwind et al. | |

OTHER PUBLICATIONS

Mohamed Mohamed; Relational vs NoSQL Databases: A Survey; International Journal of Computerand Information Technology; vol. 3, Issue 03; pp. 598-601 (Year: 2014).*

Paul Kryzyzanowski, "Distributed Transactions," Rutgers University, downloaded from web page: https://www.cs.rutgers.edu/~pxk/417/notes/content/transactions.html, download date: Feb. 3, 2015, publication date: Nov. 12, 2012, 9 pages.

* cited by examiner

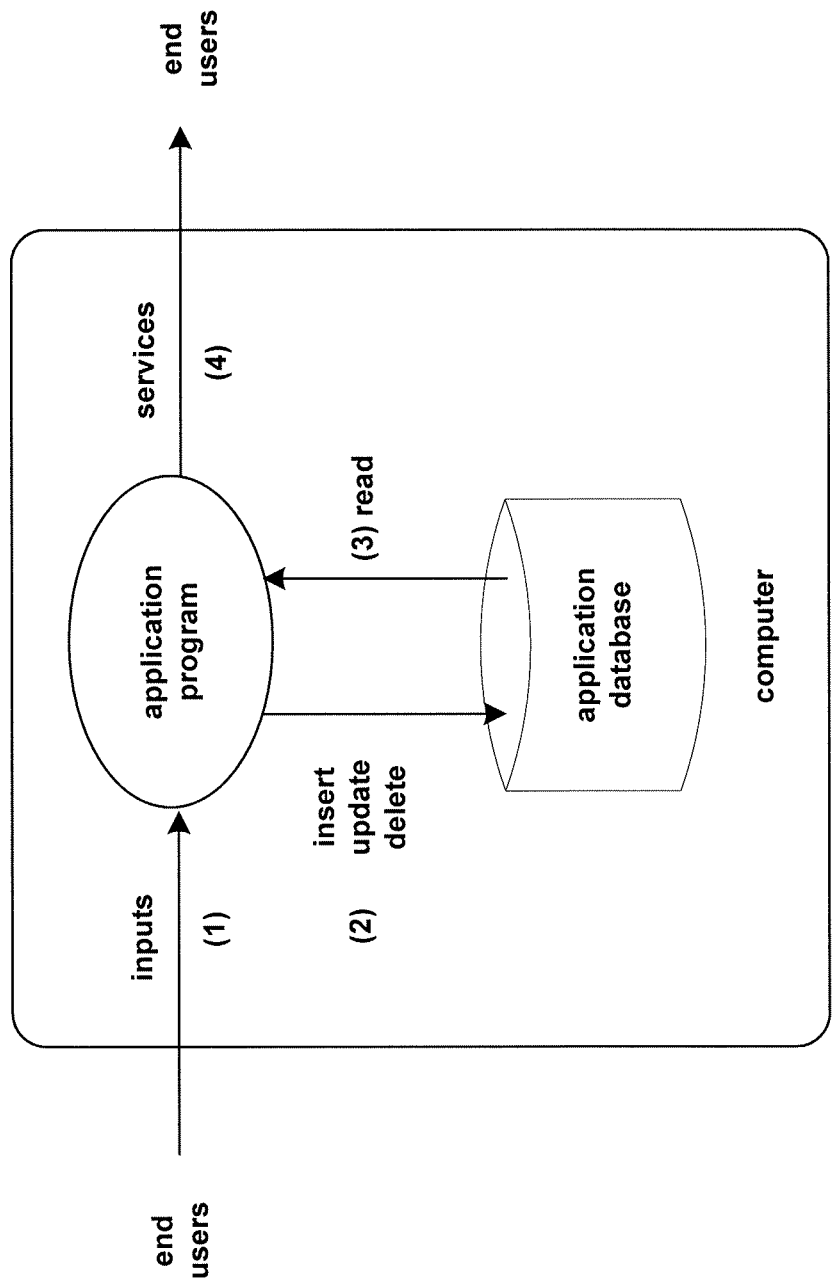

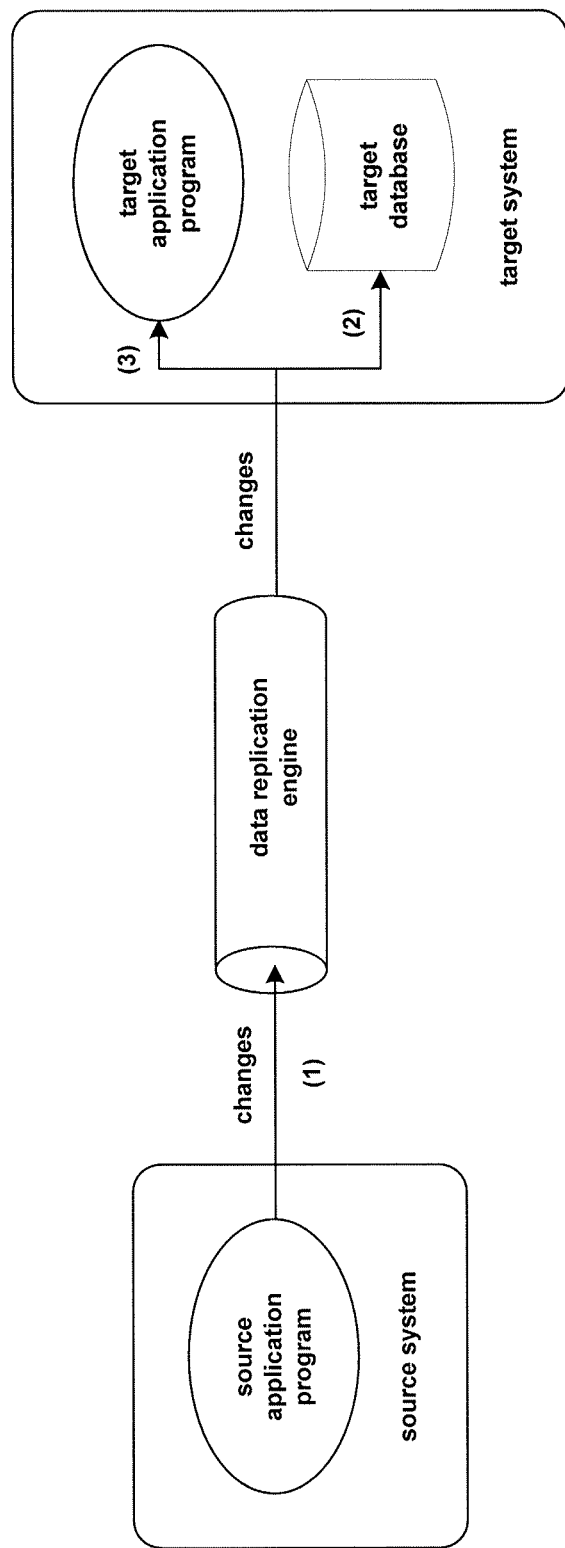
Figure 2: Prior Art - Application-Driven Data Replication Engine

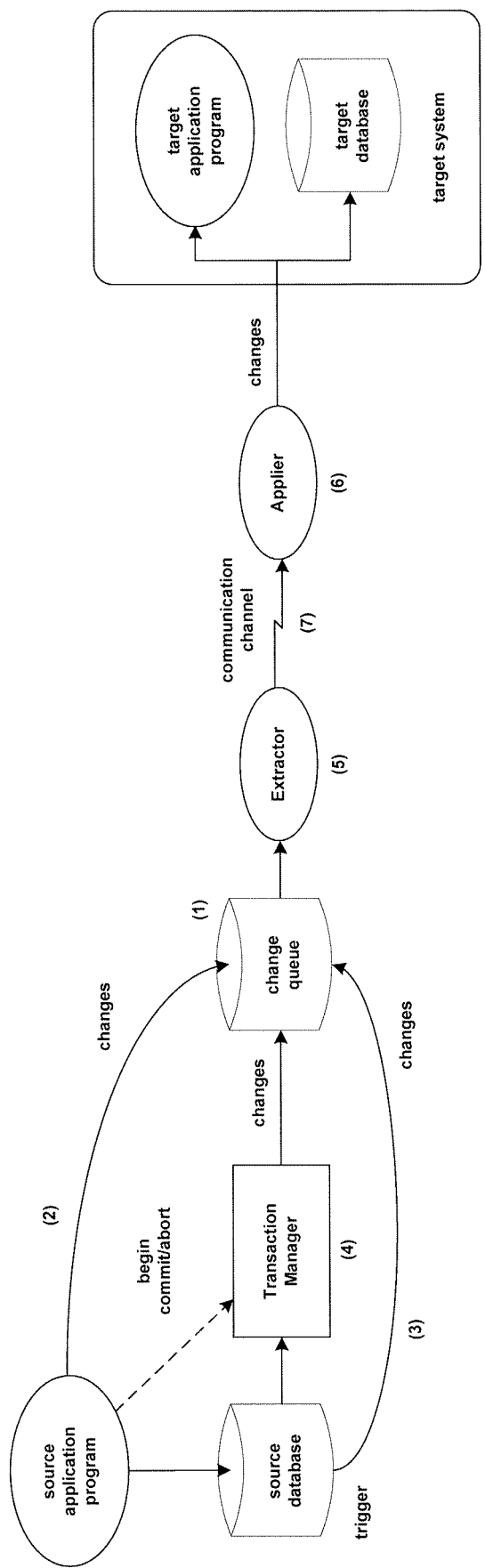
Figure 3: Prior Art - Database-Driven Asynchronous Data Replication Engine

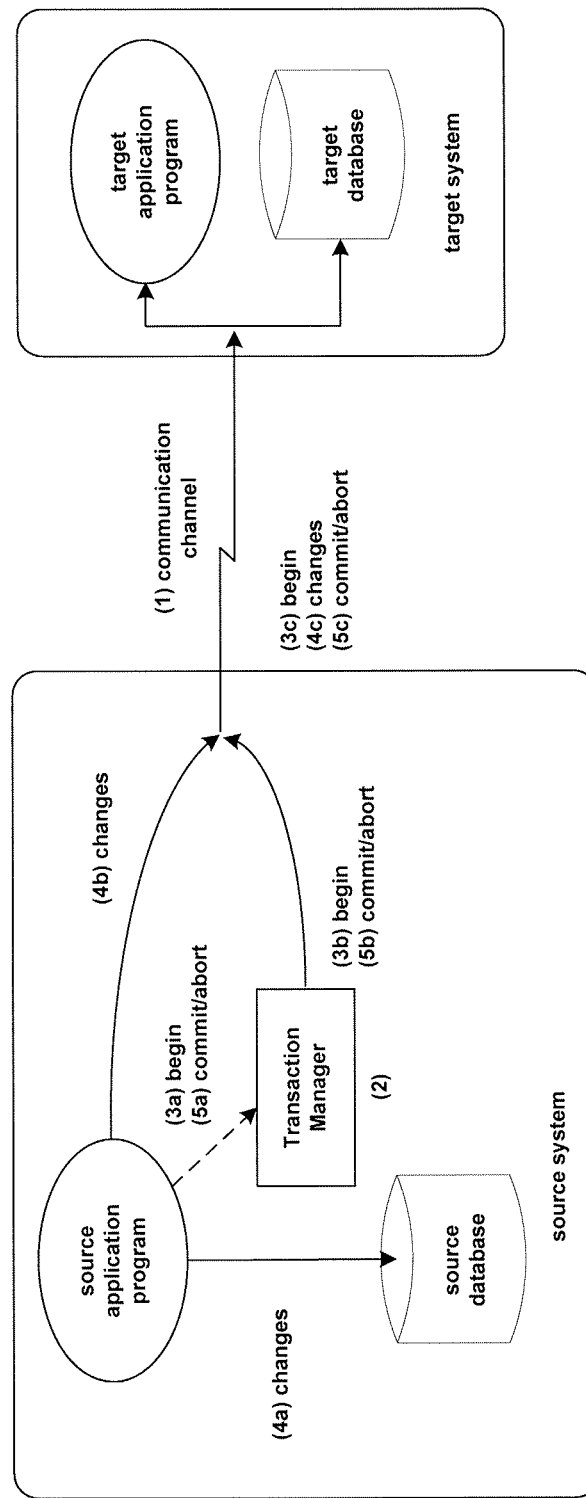
Figure 4: Prior Art - Network-Transaction Synchronous Replication

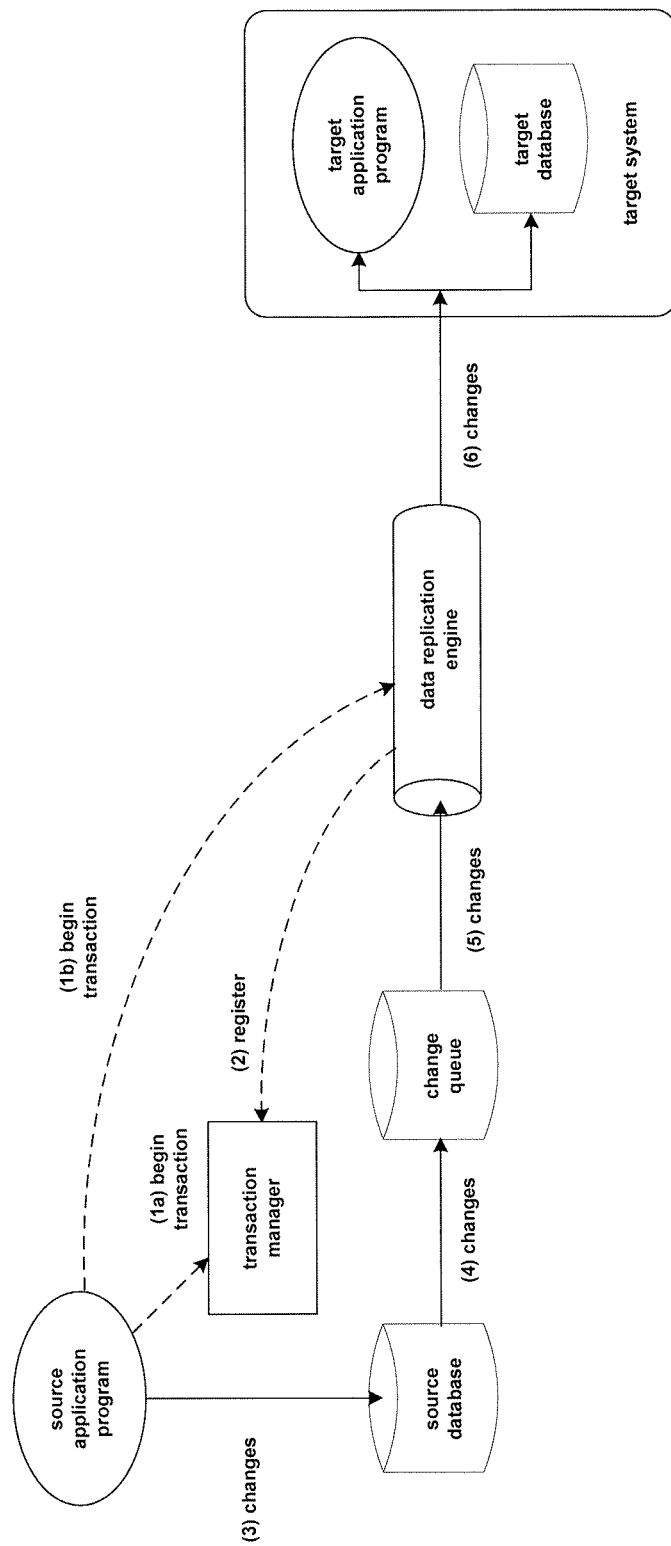
Figure 5: Prior Art - Coordinated Commits Begin Transaction/Replicate Changes

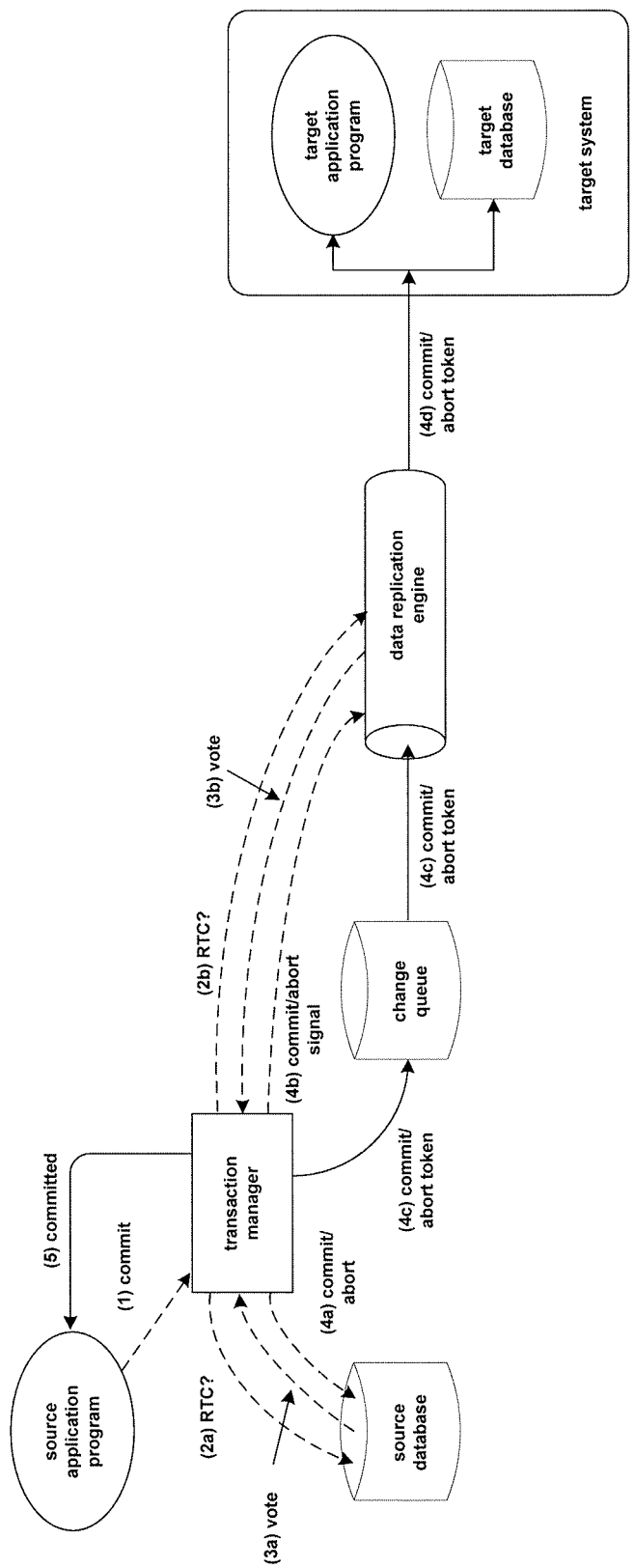
Figure 6: Prior Art - Coordinated Commits Commit/Abort

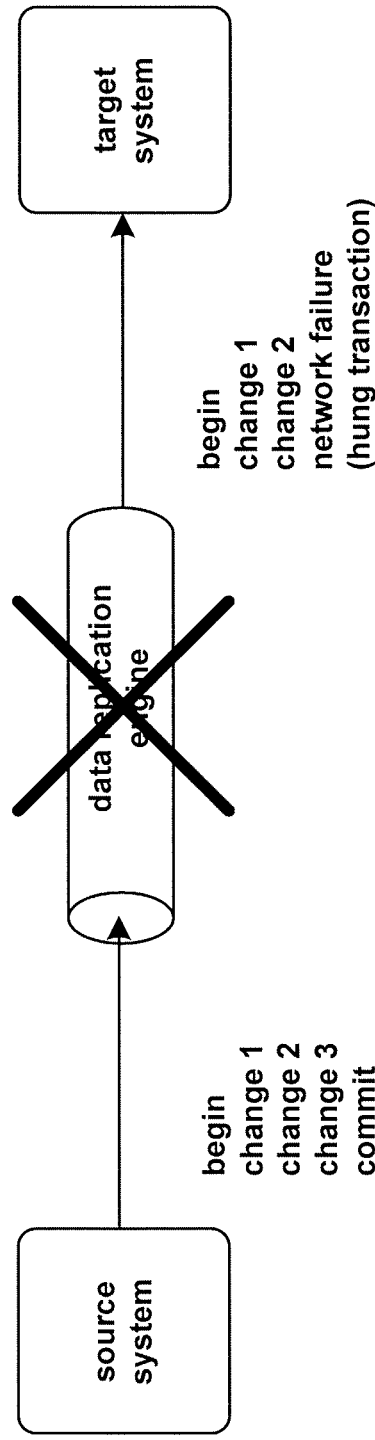
Figure 7: Prior Art – A Hung Transaction Caused by a Network Failure
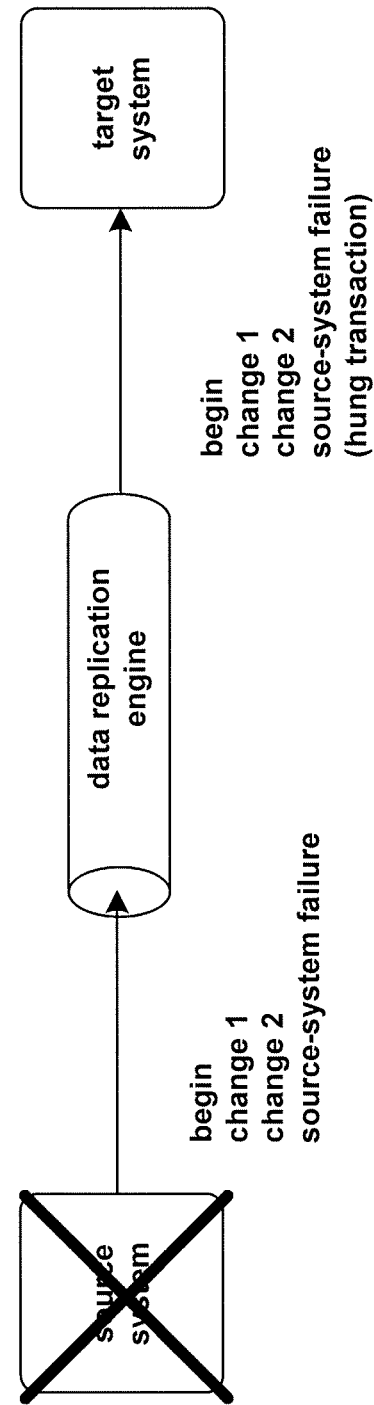
Figure 8: Prior Art - A Hung Transaction Caused by a Source-System Failure

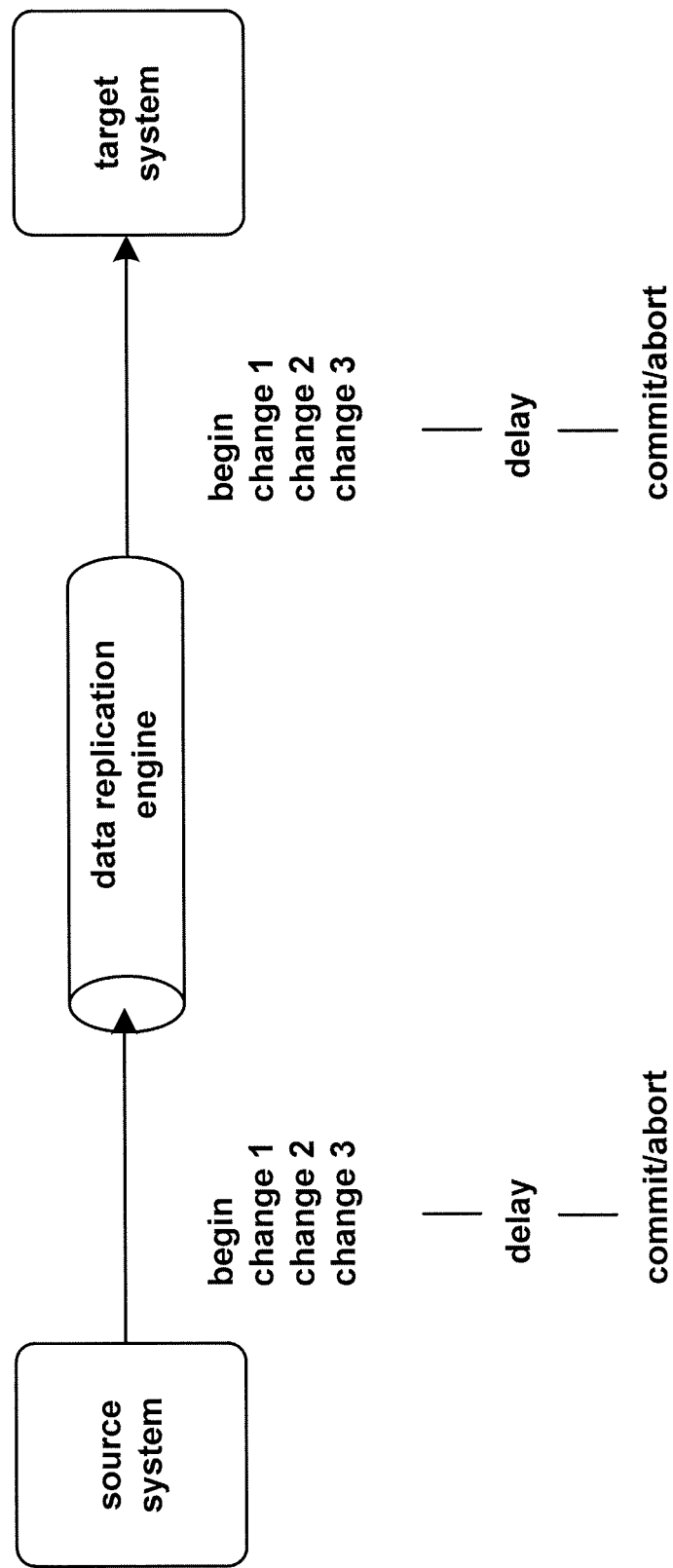
Figure 9: Prior Art - Commit Latency

| TP1 | TP2 | TP3 | TP4 |
|---|---|---|---|
| Insert row into Table A | Insert row into Table A<br>Update row in Table B | Insert row into Table A<br>Update row in Table B<br>Delete row from Table C | Update row in Table D<br>Insert row into Table A |
| 22,830 | 195,203 | 10,274 | 105,657 |

Figure 10: Transaction Probability Profile with Different Changes

| TP1 | TP2 | TP3 | TP4 |
|---|---|---|---|
| Insert row into Table A | Insert row into Table A<br>Delay 500 milliseconds<br>Insert row into Table C | Insert row into Table D<br>Insert row into Table D | Update row in Table D<br>Insert row into Table A |

Figure 11: Transaction Probability Profile with Different Commit Delays

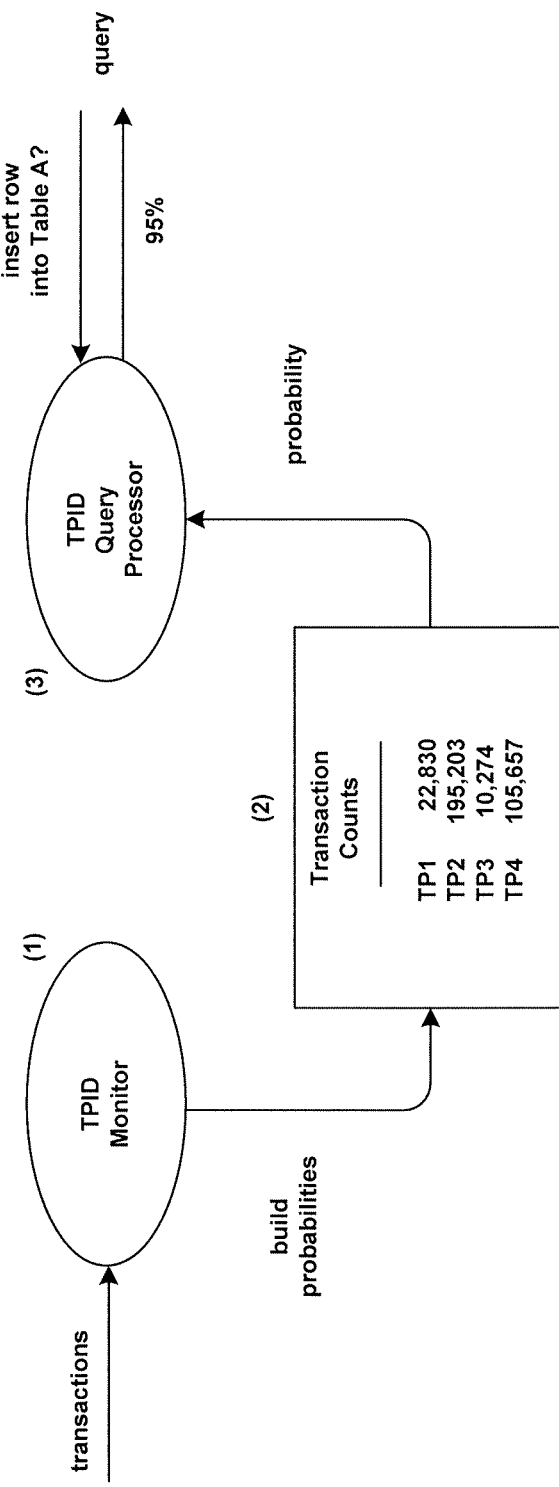
Figure 12: Transaction Pattern Identification Engine (TPID)

| Transaction Identifier | Transaction Pattern | Transaction Count | Other Attributes |
|---|---|---|---|
| TP1 | Insert row into Table A | 22,830 | dedicated terminal |
| TP2 | Insert row into Table A<br>Update row in Table B | 195,203 | process id |
| TP3 | Insert row into Table A<br>Update row in Table B<br>Delete row from Table C | 10,274 | between 9 AM and 5 PM |
| TP4 | Update row in Table D<br>Insert row into Table A | 105,657 | high priority |

Figure 13: TPID Transaction Probabilities Table

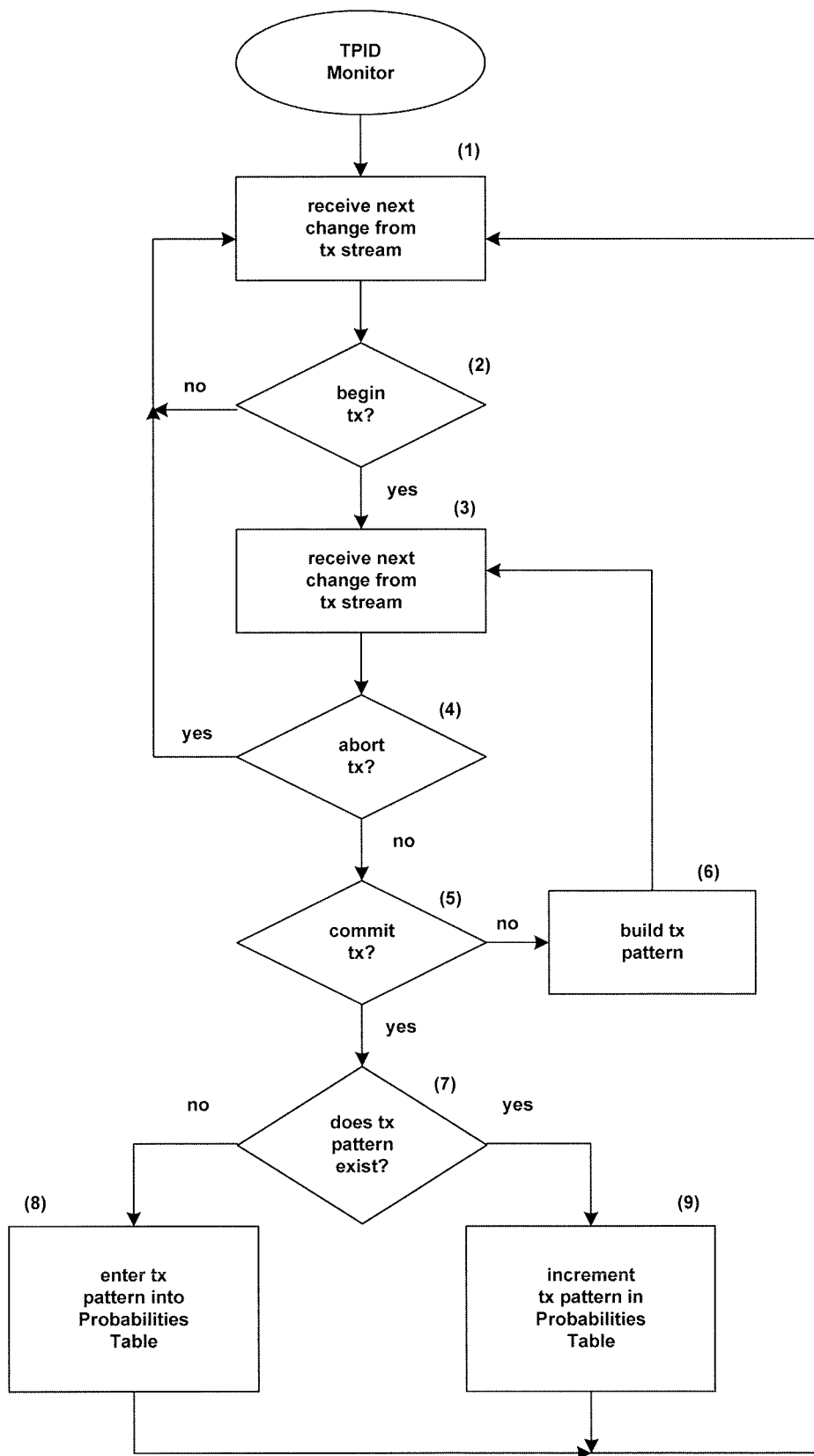
Figure 14: TPID Monitor Processing Flow

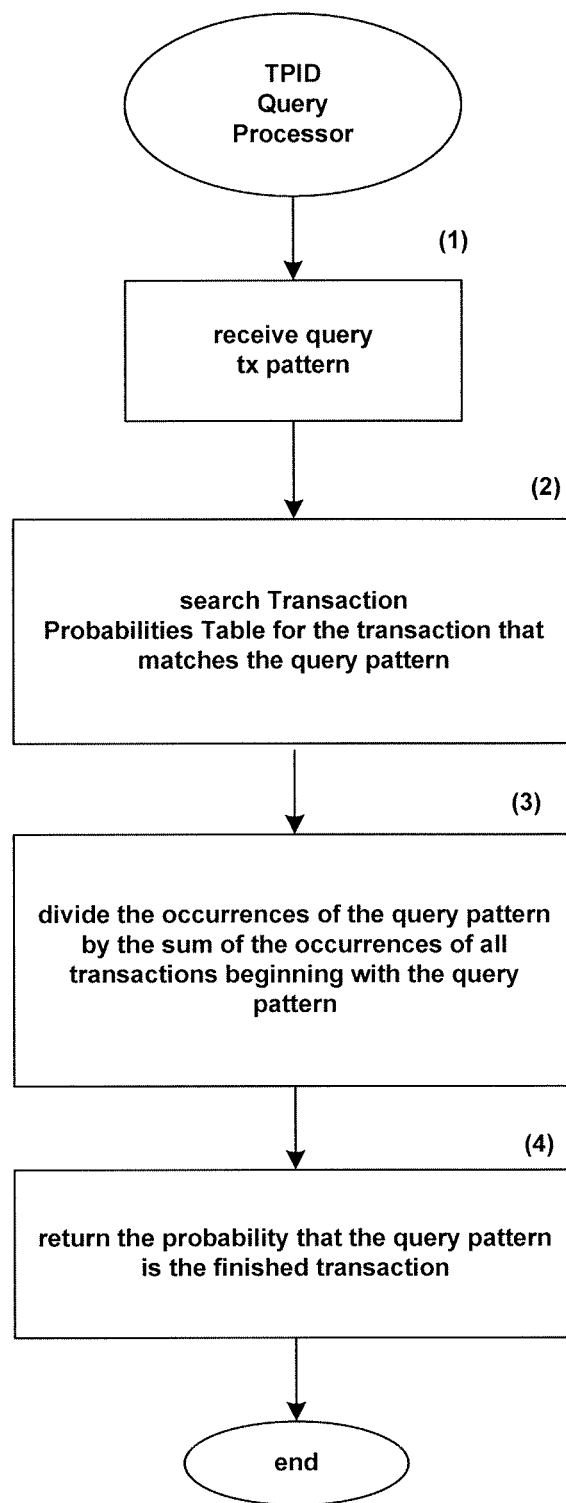
Figure 15: TPID Query Processor

| Source System | Target System | Target Failure Point Processing |
|---|---|---|
| Begin Transaction → | Transaction Started (optional) | |
| | -------- Failure (1) -------- | Ignore Transaction |
| Replicate Updates to Database → | Safestore or Apply Updates | |
| | -------- Failure (2) -------- | Hung Transaction Resolve with TPID Engine |
| Insert Commit/Abort token into change queue | Receive Commit/Abort Token Commit/Abort Transaction | |
| | -------- Failure (3) -------- | No action |

Figure 16: Hung Transaction - Asynchronous Replication

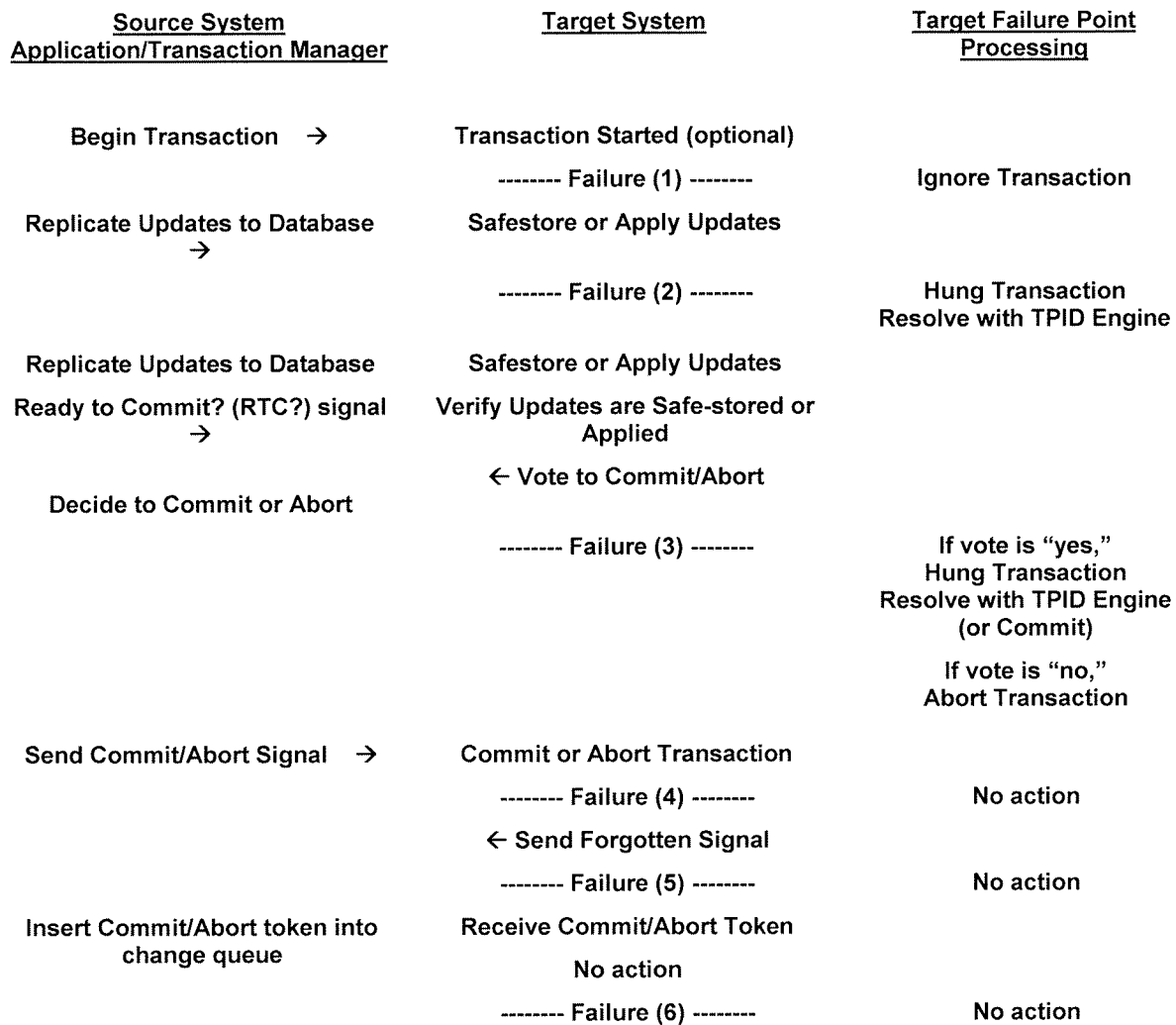
Figure 17: Hung Transaction - Synchronous Replication

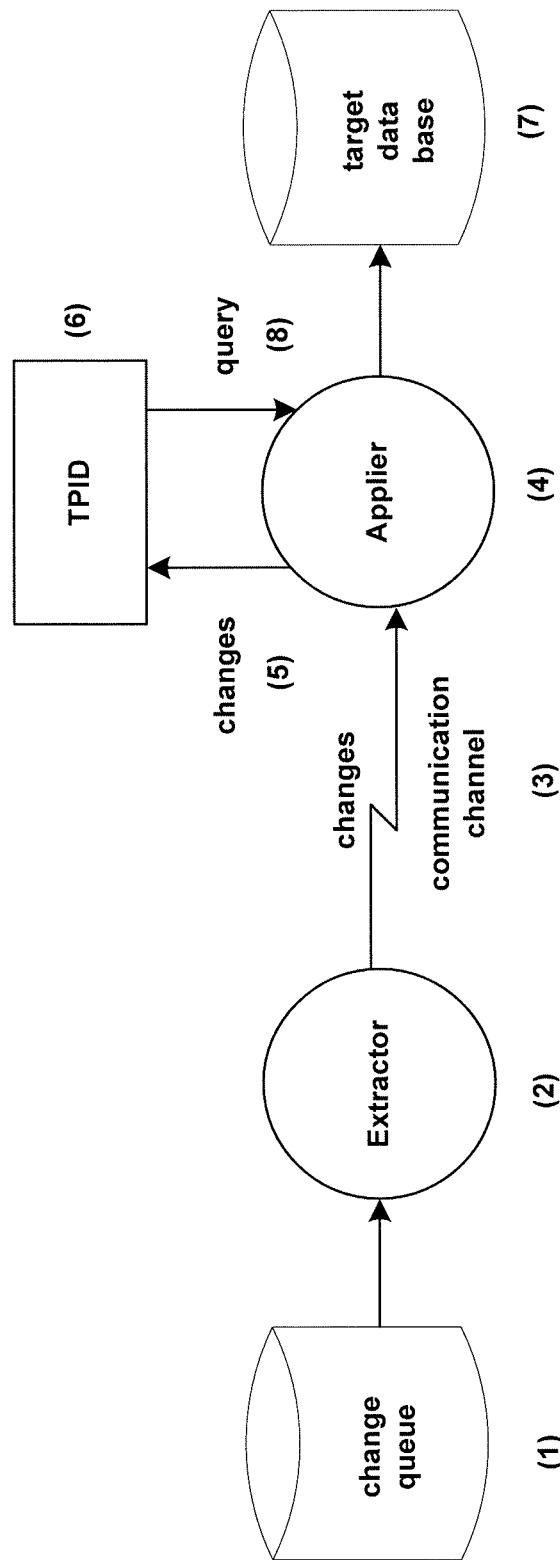
Figure 18: Resolving Hung Transactions with a Target-Side TPID

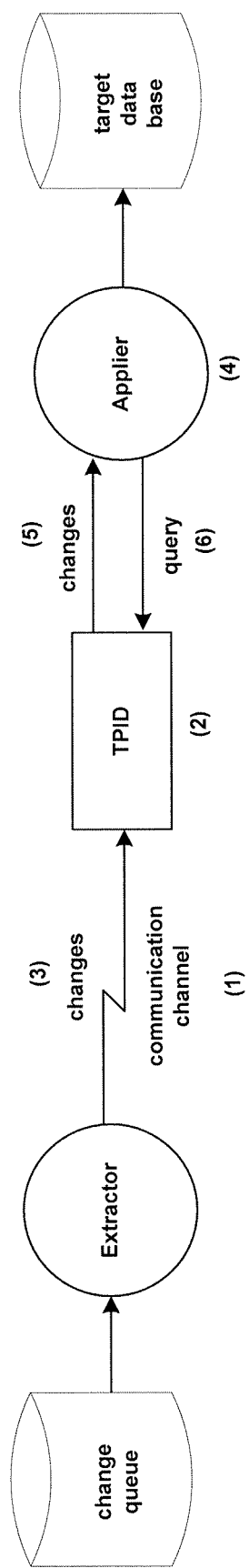
Figure 19: Resolving Hung Transactions with an In-Line TPID

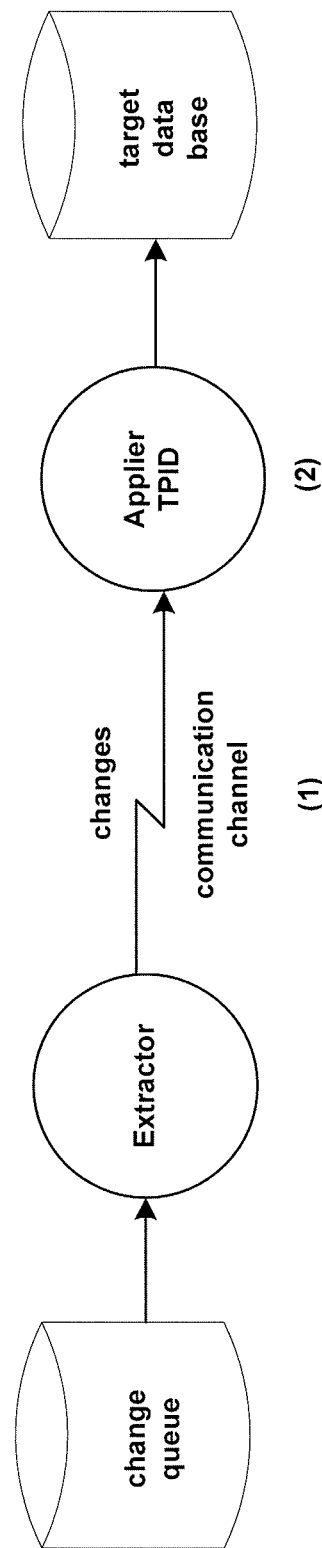
Figure 20: Resolving Hung Transactions with a Built-In TPID

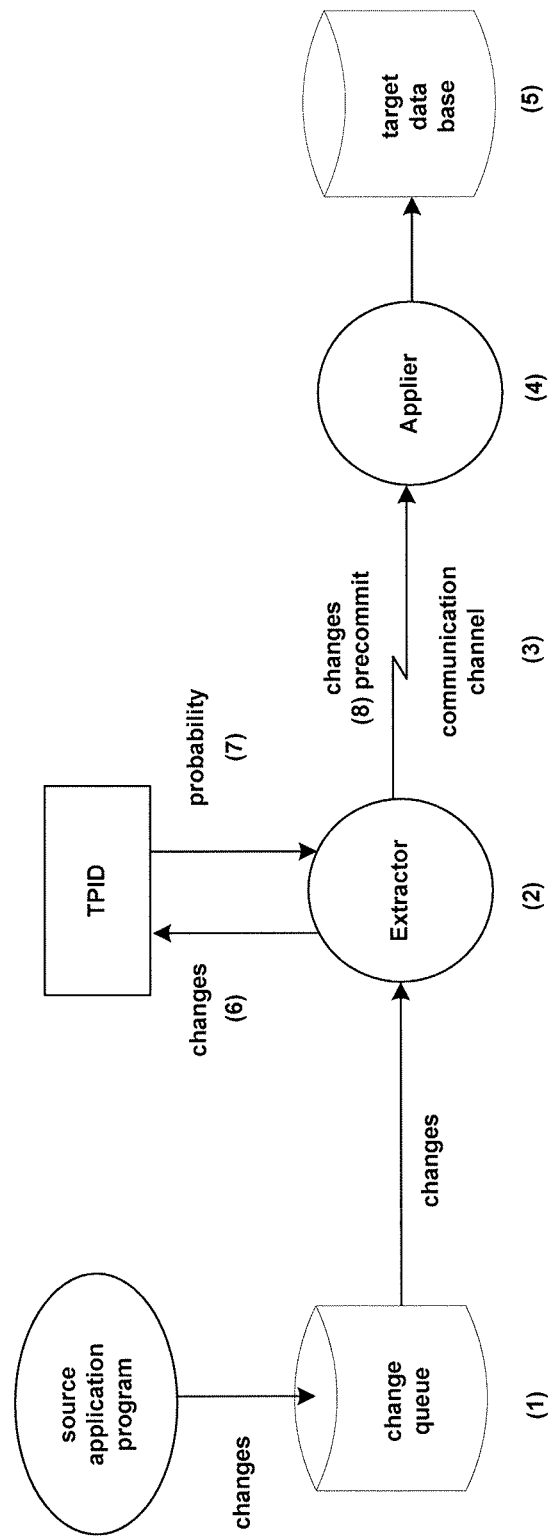
Figure 21: Reducing Commit Latency with a Source-Side TPID

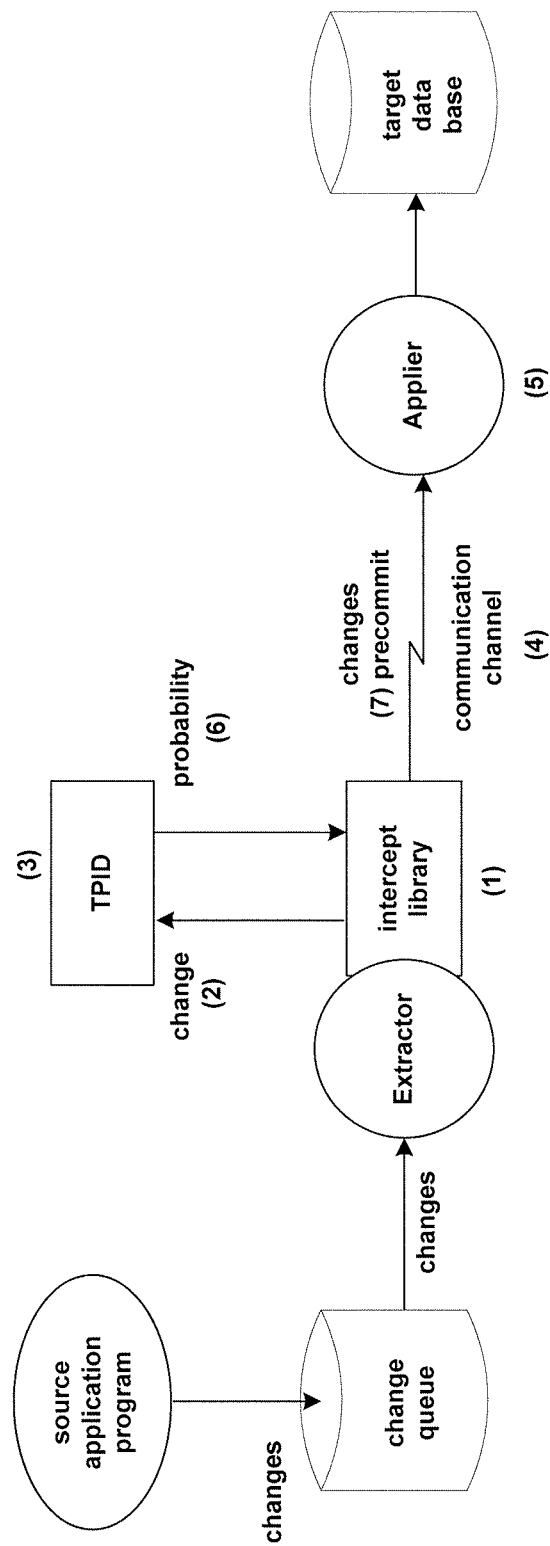
Figure 22: Reducing Commit Latency with a TPID Intercept Library

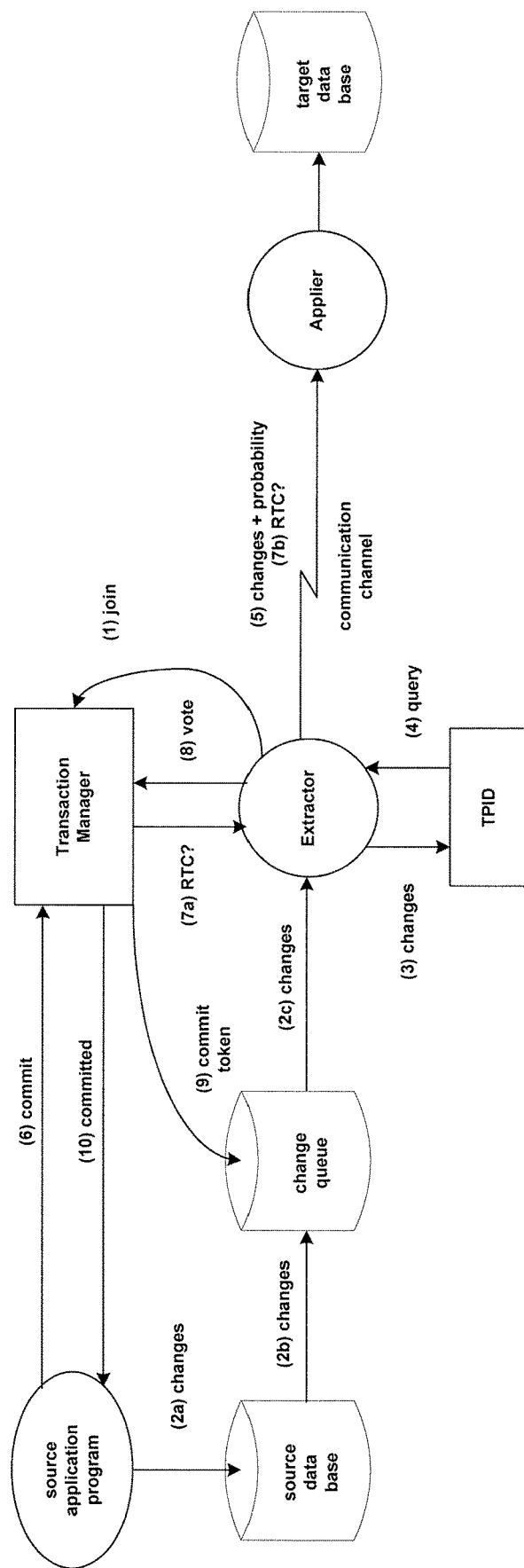
Figure 23: Reducing Application Latency in a Synchronous Replication Environment

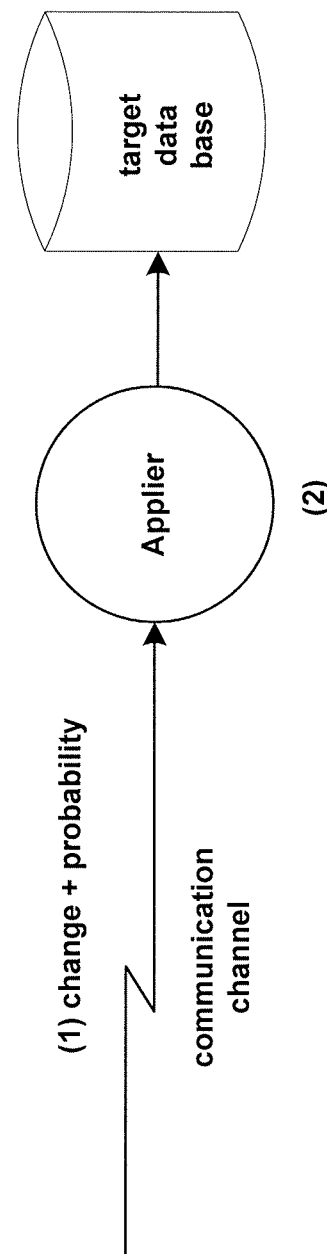
Figure 24: Replicating Probability to solve Hung Transactions and Commit Latency

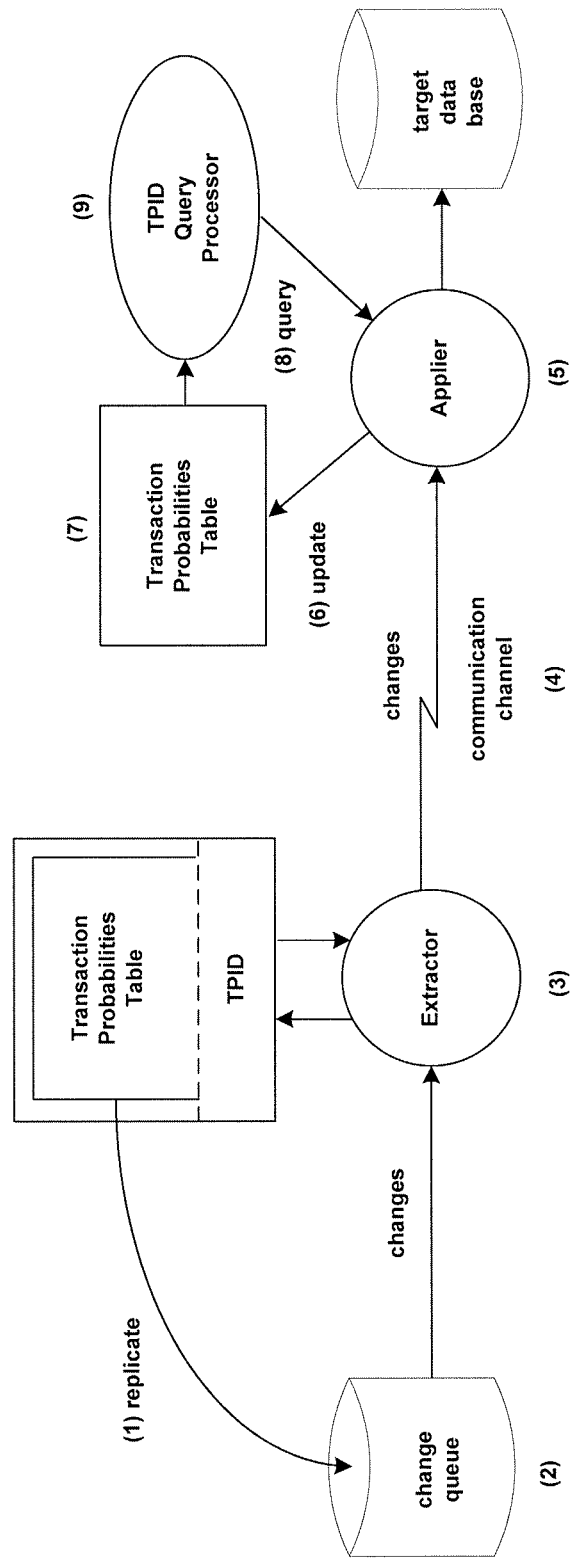
Figure 25: Table Replication to solve Hung Transactions and Commit Latency

SYSTEMS AND METHODS TO FULLY PROCESS AN INITIALLY INCOMPLETE REPLICATED AND COMMITTED TRANSACTION

CROSS-REFERENCE TO RELATED APPLICATIONS

This application is a continuation of copending U.S. application Ser. No. 14/619,804 filed Feb. 11, 2015, the entire disclosure of which is incorporated by reference herein.

BACKGROUND OF THE INVENTION

The present invention relates to certain challenges encountered when replicating data from one computer system to another. Using data replication, the database of a target computer system can be kept in synchronism with the information stored in the database of a source computer system. Alternatively, a target application can be fed database changes being made to a source database so that the target system can provide further processing services based on these events.

Database changes are typically replicated in groups called "transactions." A transaction is a related group of database updates that either must be made at all systems, or else none of them are made. A problem occurs if the source system or if the network connecting the two systems fails during replication. The target system does not know whether or not it has received all updates for each transaction in progress and therefore does not know whether to apply the updates or to reject them. This condition is known as a hung transaction.

Data replication may be accomplished asynchronously. Changes are sent to the target database after they have been applied to the source database. The target database will lag the source database by a short delay, which is called replication latency.

Data replication also may be accomplished synchronously. In this case, the source application cannot complete a transaction to its database until it is assured that the changes associated with that transaction have been received by the target system. The source application is slowed by this delay, which is called application latency.

Furthermore, whether using asynchronous replication or synchronous replication, there may be a significant delay from when the source system issues a commit directive and the target system receives the commit directive. This slows down the target system because it must hold locks on data objects that the transaction has updated, thus slowing down other applications that need to update those data objects. Such a delay is called commit latency.

Computer Applications

Data-processing applications form the basis for much of our daily activities, from business to entertainment. Most applications are implemented as one or more programs running in a computer. In many cases, an application depends upon a database of information that the application maintains to record its current state. Typically, the information in the database is fundamental to the operation of the application, to the decisions it makes, and to its delivery of services to the end users.

The application's end users may include people, other applications, devices, and other systems. In this specification, the term "end user" means any entity that can influence an application and/or can use the services that it provides.

The fundamental components of an application are shown in FIG. 1. The application comprises a database and a program that is running in a computer. The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes several files or tables, though it may be just a random collection of unorganized data. Each file or table typically represents an entity set such as "employees" or "credit cards." A file comprises records, each describing a member of an entity set such as an employee. A table comprises rows that describe members of an entity set. In this specification, "files" are equivalent to "tables;" and "records" are equivalent to "rows."

With reference to FIG. 1, the application receives inputs from certain end users (1). It processes these inputs and may make certain modifications to its database as a result (2). Database modifications are made via DML and DDL commands. DML (Data Manipulation Language) commands modify the contents of the database. Examples of DML commands are insert a row, update a row (modify its contents), and delete a row. DDL (Data Definition Language) commands typically modify the structure of the database. Examples of DDL commands include insert or delete a table and insert or delete a column in an existing table.

The application can read the contents of rows in its database (3). As part of its processing, it may read certain information from its database to make decisions. Based on the inputs it receives from its end users and the data in its database, the application delivers certain services to its end users (4). A service may be delivered as the result of a specific input from an end user, such as providing an account balance in response to an online banking query. Alternatively, a service may be delivered spontaneously by the application program, such as on a timed basis or when certain conditions occur. For instance, an alarm may be generated to operations staff if the load being carried by an electric-power transmission line exceeds a specified threshold.

The end users providing the input to the application may or may not be the same end users as those that receive its services.

Transactions

In many applications, changes to the database (for instance, inserts, updates, deletes, DDL changes to the database structure) are organized as transactions. A transaction is a delimited set of changes that must all be made to a database or sent to an application. Otherwise, none are made. For instance, a transaction in a banking application may transfer funds from one account to another. It applies a debit to one account (a reduction in its value) and an equal credit to another account (an increase in its value). Either both of these updates must occur or neither must occur in order to keep the customer's accounts balanced.

Transactions Exhibit ACID Properties—Atomicity, Consistency, Isolation, and Durability i. Atomicity means that either all operations contained within the transaction are executed against the database or none are.

ii. Consistency means that at any time, the view of the database represents an accurate view of the application data.
iii. Isolation means that a transaction is unaffected by other transactions that are executing simultaneously.
iv. Durability means that the resulting modification to the database by a transaction will survive any subsequent system failures.

The changes comprising a transaction are delimited by a pair of directives. The beginning of a transaction is identified by a Begin Transaction directive (in some systems, the Begin Transaction directive is implied by the first change of a new transaction). The conclusion of a transaction is either a Commit Transaction directive or an Abort Transaction directive. A Commit Transaction directive causes all of the changes within the transaction to be applied. An Abort Transaction directive causes the changes within the transaction to be discarded. Though the terms Begin Transaction, Commit Transaction, and Abort Transaction are used in this specification, they are often known by different terms in different systems. However, the actions they denote are substantially the same in all systems.

A typical transaction appears as follows:
Begin Transaction
Insert Row A
Read Row B
Update Row B
Delete Row C
Commit Transaction The property of atomicity is guaranteed by ensuring that either all updates within the transaction are applied or none are.

The property of consistency is typically guaranteed by locking all data objects that are to be changed so that their value is hidden from other applications until they have been committed as an entire transaction.

The property of isolation is typically also guaranteed by locking all data objects that are to be changed so that no other transaction can modify their values until the current transaction commits.

The property of durability is typically guaranteed by writing the changes to a persistent database such as disk so that the changes survive any ensuing system failures.

In some implementations, the ACID properties are relaxed. For instance, consistency and isolation may be sacrificed to improve performance. An example of this is the BASE transaction protocol (see "Distributed Transactions," Paul Krzyzanowski, Rutgers University; November 2012).

Data Replication

Many applications share data between two systems. This can be accomplished using data replication. A data replication engine accesses data changes generated by a source system and transfers them to a target system. The transfer may be made to a target database, in which case the replicated changes are applied to the target database. Alternatively, the transfer may be made to a target application, in which case the target application applies further processing to the replicated changes. Changes sent from the source system to a target database or application are also known as events.

A source application may send changes directly to the data replication engine, as shown in FIG. 2. In this configuration, each change that the source application generates is passed directly to the replication engine (1). The replication engine transfers the change to a database (2) or to another application (3) on the target system.

Alternatively, in many applications, one or more source applications make changes to a local source database. The replication engine follows these changes and replicates them to the target system database or applications. In order for changes to be passed to the replication engine, the changes are typically made available to the replication engine via a change queue. The change queue contains all of the database changes made by the various source applications. Though the changes from one application will be mixed with the changes from other applications, the order of changes made by one application is maintained in the change queue. The replication engine follows the insertion of changes made into the change queue and replicates them to the target system.

As illustrated in FIG. 3, there are several methods to create a change queue (1). The change queue may be created directly by the source application (2). As it makes changes to its source database, the source application also enters the changes into the change queue.

The change queue can be created from triggers in the source database (3). Whenever a database item is changed, a trigger in the database invokes a program (a stored procedure) that places the change in the change queue.

A common technique is to use the change log created by a transaction manager as the change queue. In most systems that support transactions, a transaction manager (4) handles the details of transaction processing, including data-object locks and begin/commit/abort directives. As part of its recovery mechanism, the transaction manager maintains a log of all changes (1) made to the database. This log can be used to reconstruct transactions that may have been lost due to a system failure. It can also be used to feed changes to the data replication engine.

The replication engine comprises an Extractor (5) and an Applier (6). It is the job of the Extractor to follow the change queue and to read the changes as they are entered into the change queue. The Extractor sends each change (or blocks of changes to improve communication-line utilization) over a communication channel (7) to the Applier, which applies the changes to the target database and/or passes them on to one or more target applications.

For increased performance, the various components of the replication engine can be multithreaded. There may by multiple Extractors, multiple communication channels, and multiple Appliers all sharing the replication load.

To facilitate heterogeneity so that replicated data can be applied to different types of databases and applications, the replication engine typically provides powerful format conversion capabilities so that the data format of source-system changes can be automatically converted to the data format required by the target system.

In many applications, replication is performed on transactions. Although individual changes are sent from the source system to the target system, the target system will hold them until it receives a transaction-completion directive from the source system. If this directive is a commit transaction, the target system will process the changes. If the directive is an abort transaction, the target system will reject the changes.

Asynchronous Replication

There are two fundamental types of data replication—asynchronous replication and synchronous replication. The replication methodology described with respect to FIG. 3 provides asynchronous replication. Changes are replicated after the fact from a change queue (1). The change queue is populated as the source application program makes changes to its local database. The change queue can be populated by the source application program (2), the source database (3), or by the transaction manager (4). After the change has added to the change queue, the replication engine reads the changes from the change queue (5), sends them over the communication channel (7) and applies them to the target database or forwards them to the target application program.

If transactions are replicated, they are typically managed at both the source system and target system by a transaction manager. The source system will begin a transaction, and the target system will begin a separate transaction when it receives the begin-transaction directive or the first change for a new transaction.

If replication is to a target database, the changes will be safe-stored by the target database or will be applied to the target database under the control of its transaction manager. When the transaction is completed on the source system, the transaction manager will insert a commit/abort token into the change queue. This token will be replicated to the target system, where it will cause the target system to either commit the transaction to the target database or to abort it, as appropriate.

If replication is to a target application, the application will safe-store the changes until it receives a transaction-completion directive via the replicated commit/abort token. If it is told to commit the transaction, the application will process the changes. If it is told to abort the transaction, it will ignore the changes.

The source application is unaware that replication is taking place and is unaffected by it. However, there is a delay, known as replication latency, from the time that the source system changes its database to the time that the change is received and is processed by the target system. Typical values for replication latency are tens of milliseconds to minutes, depending upon the implementation of the replication engine. If the source system should fail, any changes that are in the replication pipeline will be lost.

The Shadowbase asynchronous data replication engine from Gravic, Inc., is an embodiment of the asynchronous replication engine depicted in FIG. 3.

Synchronous Replication

With synchronous replication, no change can be completed at the source database until the target system has acknowledged that it has safe-stored the change or has applied it to its database. Thus, no data will be lost if the source system fails. The target system is guaranteed to have received all of the changes generated by the source system prior to its failure.

Network Transactions

A synchronous replication method known as Network Transactions is shown in FIG. 4. This method does not use a separate data replication engine. Rather, the replication logic is built into the source application. Each operation made by the source application to its local database is also made to the target database or is sent to the target application by the source application. The source application must wait for the operation to complete at both the source and target systems before it can declare the operation complete. If the operation successfully completes on only one of the systems, it is treated as a failed operation by the source application.

With respect to FIG. 4, the source system is connected to the target system via a communication channel (1). In order to execute a synchronously replicated transaction, the source system must first request that the transaction manager (2) begin a transaction (3a). The transaction manager knows that the target system is a party to the transaction, and it sends a begin-transaction directive (3b) to the target system (3c), thus allowing the target system to join the transaction.

As the source system makes a change to its local database (4a), it also sends that change (4b) over the communication channel to the target system (4c). The source system must wait for the target system to respond that it has safe-stored the change or has applied the change before it can continue to its next operation.

When all changes have been applied to both systems, the source application requests the transaction manager to commit or abort the transaction (5a). The transaction manager sends a commit-transaction or an abort-transaction directive (5b) to the target system (5c) so that the target system can vote on the transaction. If the source system asked for the transaction to be committed, and the target system votes "yes," the transaction is committed on both systems. If the source system aborted the transaction, or if the target system votes "no," the transaction is aborted on both systems.

Thus, the transaction is guaranteed to either be totally applied to both systems or be applied to neither system. This is the transaction attribute of atomicity as described earlier.

As a result of having to wait for each operation—the begin directive, each change, and the commit/abort directive—to applied on the target system, the source application slows down. The increased delay imposed upon the source application as the result of synchronous replication is known as application latency. Application latency increases as the distance between the source and target system increases because of the time that it takes for signals to move between the two systems. Consequently, synchronous replication with Network Transactions is typically limited to tens of miles, suitable for a campus or metropolitan area, Asynchronous replication, on the other hand, can be used over thousands of miles.

Coordinated Commits

Another method for synchronous replication is Coordinated Commits. Coordinate Commits uses a combination of the asynchronous and synchronous replication methods described above in the sections entitled "Asynchronous Replication" and "Synchronous Replication" to eliminate the challenges of data loss, to substantially reduce application latency, and to eliminate data collisions.

Coordinated Commits utilizes an asynchronous replication engine that joins a transaction initiated by the source application, as shown in FIG. 5. When the source application informs the transaction manager that it is starting a transaction (1a), it also informs the data replication engine (1b). The data replication engine registers with the transaction manager to tell the transaction manager that it is joining the transaction (2). In this way, it becomes a voting member of the transaction and can join in the determination as to whether the transaction should be committed or aborted.

At this point, the transaction manager can communicate with the target system by sending it events via the change queue over the replication channel. The transaction manager also can communicate directly with the replication engine and the target system without having to wait for events to propagate via the change queue. It does so by using "out-of-band" signals sent to the replication engine.

The begin directive and all database changes made by the source application to its database (3) are asynchronously replicated to the target system via the change queue. As the source database is modified, the changes are captured in the change queue (4). The replication engine fetches the changes from the change queue (5) and replicates them to the target system (6), as described earlier in the section entitled "Asynchronous Replication".

The completion of the transaction is shown in FIG. 6. When the source application is ready to commit the transaction, it issues a commit directive to the transaction manager (1). The transaction manager will ask all of the parties that have joined the transaction to vote on whether or not they are ready to commit (RTC?) the transaction. In the case of FIG. 6, the parties are the source database system (2a) and the data replication engine (2b), which receives an RTC? signal from the transaction manager. If the transaction has been safe-stored on the source database, the source database system will respond with a "yes" (3a). If all changes have been replicated and safe-stored on the target system, the replication engine will vote "yes" to the commit request (3b).

If all voting parties respond positively, the transaction manager will tell the source database system to commit the transaction (4a) and optionally tell the replication engine to commit the target transaction via a commit signal (4b). The transaction manager will write a commit token into the change queue (4c). At this point, the transaction manager will inform the application that the transaction has committed (5). If instead, any party to the transaction responds negatively, the transaction manager will tell all parties to the transaction to abort the transaction.

If the transaction manager has signaled the replication engine to commit or abort the transaction (4b), the target system will commit or abort the transaction and will ignore the commit token when it is later received over the replication channel (4c). If the replication engine is not informed of the commit or abort by a transaction manager signal, the target system will commit or abort the transaction when it receives the commit token over the replication channel.

Note that the source system does not have to wait until the transaction is actually committed at the target system. The source system knows that the transaction will complete as soon as the target system receives the commit signal from the transaction manager or receives the commit token over the replication channel.

Thus, with the Coordinated Commits method, changes are replicated asynchronously; but the commit or abort completion of the transaction is coordinated between the source and target systems. The transaction will either be committed on both systems, or it will be committed on neither.

The time that the source system must wait for the target system to vote and then to receive a commit directive adds to the transaction processing time of both the source and target systems. This additional time is called application latency and is comprised in large part by the additional commit time, which is called commit latency. The target-system commit latency is significantly reduced if it gets its commit directive directly from the transaction manager as a signal rather than having to wait for the commit token to be replicated. Commit latency can be reduced by other enhancements as well. For instance, if the target system responds to replicated updates with an acknowledgement signal to the source system, the source system will know in advance whether the target system is ready to commit without having to go through the target system's voting process. If the target system has acknowledged the receipt of the last update, the source system knows that the target system has received and safe-stored or applied all of the transaction updates. This is an implied "yes" vote, and the replication-engine voting sequence can be bypassed.

Since the source system must only wait for the target system to acknowledge that all of the data for the transaction has been safe-stored, the application latency that Coordinated Commits imposes on the source application is minimal. Thus, the source and target nodes can be separated by thousands of miles rather than by tens of miles.

With Coordinated Commits, there is no data loss if the source system or replication network fails, as transactions are either committed or aborted on both systems. Application latency is greatly reduced because the source application only has to wait for the commit response from the target system. It does not have to wait on a round-trip network communication on every database change before proceeding.

Bidirectional Replication

In some applications, all processing nodes are active. All the nodes are processing transactions. A transaction can be sent to any node in the application network and can be processed in the same way that it would be if it were sent to another node. This mode of operation is known as active/active processing.

In order for each node to properly process a transaction, all nodes must have the same view of the application database. This is achieved by replicating a change made by any one node to every other node in the application network. Since changes are replicated in either direction between two nodes, this is known as bidirectional replication.

Bidirectional replication imposes a new challenge in addition to asynchronous replication data loss or synchronous replication application latency. This is the problem of data collisions.

In an asynchronous bidirectional replication system, it is possible for two separate nodes to update the same data object within the replication latency interval. Each change will be replicated to the other node and will overwrite the change originally made at that node. Now, both nodes have a different value for the data object, and both are wrong. There are methods for resolving data collisions automatically by establishing rules that assign a priority to the changes (such as the earliest change is accepted). If automatic resolution is not possible, the collision must be resolved manually.

A similar challenge occurs with synchronous bidirectional replication except that data collisions potentially become deadlocks, during which time neither system can proceed. Deadlocks can occur if both systems acquire locks in a different order. For instance, assume that as part of a pair of transactions, System A wants to update Rows 1 and 2. System B, on the other hand, wants to update Rows 2 and 1, in those orders. Each system must acquire a lock on its row before it can update it (the transaction attributes of consistency and isolation, as described earlier). System A will acquire a lock on Row 1, and System B will acquire a lock on Row 2. Now System A cannot update Row 2, and System B cannot update Row 1. The two systems are deadlocked. A means must be provided to detect and resolve deadlocks, perhaps by having one or both systems release their locks and try again later.

Example Embodiments

The Shadowbase ZDL Plus SR replication engine is an embodiment of the Coordinated Commits synchronous replication engine depicted in FIG. 5 and in FIG. 6 that provides bidirectional replication. The Shadowbase ZDL synchronous replication engine is a modification of this architecture and further reduces application latency but allows data collisions. Rather than applying changes to the target database or target application prior to responding with its vote, Shadowbase ZDL simply ensures that changes are all safe-stored and can be applied following its vote.

Hung Transactions

If asynchronous replication is being used, and if the source system or the network fails, there is the possibility that some changes will be lost and will not make it to the target system. However, there is another problem that is caused under such failures regardless of whether asynchronous replication or synchronous replication is used. One or more transactions may become hung.

A hung transaction is one that is in progress at the time of the source system or network failure and whose completion status is unknown to the target system. For some transactions in progress, the failure may have occurred at a time when more changes needed to be replicated. For others, the replication of changes may have been completed; but the failure occurred before the target system was notified of the commit or abort of the transaction.

Several possible scenarios can cause a hung transaction. They include:
  i. The network fails, but the source application continues to process the transaction and commits it. The target system does not know that it should commit the transaction.
  ii. The network fails, but the source application continues to process the transaction and aborts it. The target system does not know that it should abort the transaction.
  iii. The source system fails before it has completed the transaction. The target system does not know that it should abort the transaction.
  iv. The source system has committed the transaction but fails before the commit directive can be replicated. The target system does not know that it should commit the transaction.
  v. The source system has aborted the transaction but fails before the abort directive can be replicated. The target system does not know that it should abort the transaction.

Examples of hung transactions are shown in FIG. 7 and in FIG. 8. FIG. 7 illustrates a hung transaction caused by a network failure. FIG. 8 shows a hung transaction caused by a source-system failure.

Unfortunately, in these cases the target system has no way to know how to complete the transaction. Hung transactions often require manual intervention to resolve the transaction's completion.

Commit Latency

As described earlier, synchronous replication imposes application latency on the source application as it must wait for the target system to acknowledge each change (Network Transactions) or just the commit/abort directive (Coordinated Commits). However, there is an additional factor that can increase application latency whether synchronous replication or asynchronous replication is used. The source application may continue to process the transaction without issuing any more changes but before it issues its commit. This additional processing will impose a delay between the last change issued by the source application and the commit. Furthermore, the transaction manager may impose an additional delay in the commit process; and the replication of the commit token to the target system will add even more delay. The delay from the time that the source application has issued its commit request to the time that the commit happens at the target system is known as commit latency.

Commit latency slows down the source system and causes the target system to hold locks longer than necessary on the data objects that are being updated. Extended locking at the target system is a particular problem in active/active systems, in which both systems are actively processing transactions, as the extended lock time will slow down applications in the target system as well as in the source system. FIG. 9 illustrates this problem.

What is needed are methods that can categorize and predetermine the completion of a transaction by the target system before it is notified of the completion by the source system. Such methods would allow a target system to verify whether a hung transaction should be committed or aborted. In addition, the source system could determine the probable completion of a transaction and could pre-commit the transaction at the target system as a means to reduce commit latency.

Specifically, a method for both the source and target systems to categorize and determine the probability that a transaction has been completed can be used to reduce the delay in releasing target-system locks caused by commit latency by pre-committing the target transaction.

Additionally, such a method can be used by target system to determine the probable completion status of a hung transaction so that the target system can commit or abort the transaction.

BRIEF SUMMARY OF THE INVENTION

In one preferred embodiment of the present invention a method is provided that allows the source application and the target application to categorize an incomplete transaction and determine that a transaction has most likely completed before a commit or abort completion directive is received from the source application.

Transaction profiles and metrics comprise "transaction patterns" and are continuously monitored by a Transaction Pattern Identification Engine (TPID), which builds a probabilistic model of the change content of each transaction generated by the source application. The change flow within a transaction can then be monitored by the source system or by the target system. The change flow can be compared to the probabilistic model and metric of occurrence held by the TPID to determine the probability that the transaction has, in fact, completed all data changes prior to the receipt of the commit or abort directive. This probability can be used to further process the transaction such as pre-committing the transaction on the target or committing hung transactions.

If the source system determines that it is highly likely that the transaction has completed all data changes, it can notify the target system to pre-commit the transaction prior to the receipt of a commit directive from the source application.

Alternatively, the target system can monitor the probability that the transaction has committed (by using a metric of occurrence of the transaction pattern) and can pre-commit it if it is highly likely that all changes for the transaction have been received. In this way, commit latency can be reduced significantly.

With respect to hung transactions, the TPID probabilistic model can be used by the target system to determine whether to commit or to abort a transaction. If it is likely that the transaction has completed on the source system, the target system can decide to commit the transaction. If it is unlikely that the transaction has completed, the target system can abort the transaction.

Following the restoration of a failed system or network may be a discovery that a hung transaction that was aborted at the source system was actually committed at the target system. Conversely, a hung transaction aborted at the target system may have been committed by the source application. Likewise, a transaction that was pre-committed to avoid commit latency may have contained additional changes following the pre-commit; or it may have been subsequently aborted by the source application. Means are provided to correct erroneous commits and aborts.

In other embodiments of the present invention, methods for interfacing the TPID with the various replication-engine components are set forth in the detailed description of the invention.

Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for non-relational databases. A file is made up of records, and each record describes an entity instance. A record is made up of fields, each of which describes an attribute of the entity set. In this specification, the term "table" is to be interpreted as "table and/or file."

Database—A collection of related tables or files.

Column—A table component that holds a single attribute, such as SALARY, of the entity set.

Field—A file component that holds a single attribute, such as SALARY, of the entity set. In this specification, the term "column" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row and/or record."

Data Manipulation Language (DML)—The operations that control the contents of a database, such as insert, update, delete, and read a row or record.

Data Definition Language (DDL)—The operations that control the structure of a database, such as add or delete a column or a table.

Source Database—The current application database.

Source System—The system holding the source database.

Target Database—The database to which the source database changes are being replicated.

Target System—The system holding the target database (can be the same system as the source system).

Program—An executable set of programming code for providing a specific function.

Process—A program running in a computer. One program can be spawned as multiple processes.

Application—One or more processes cooperating to perform a useful function for end users.

End Users—People, systems, devices, applications, or any other entity that can influence an application or use the services that it provides.

Transaction—A delimited set of database operations (inserts, updates, deletes) that are either all made or none are made. A transaction is guaranteed to leave the database in a persistent, consistent, and correct state; and its results are typically guaranteed to survive any system failures.

ACID Properties—Transactions maintain the ACID properties of atomicity, consistency, isolation, and durability. Atomicity means that either all operations contained within the transaction are executed against the database or none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed; and the attributes of isolation and consistency may not be rigorously enforced.

Atomicity—See ACID Properties.

Begin Transaction—A directive that indicates the beginning of a transaction. A begin-transaction directive may be explicit, or it may be implicit with the first database operation for a transaction.

Commit Transaction—A directive that indicates that a transaction has successfully completed and should be made durable.

Abort Transaction—A directive that indicates that a transaction has been unsuccessful and should be undone, with no effect on the database.

Incomplete Transaction—a transaction that has been started (the begin transaction directive has been issued) but has not issued or received the Commit Transaction or Abort Transaction directive.

Completed Transaction—a transaction whose outcome is known because the Commit Transaction or Abort Transaction has been issued or received.

Pre-Committed Transaction—a transaction with changes that have been made durable and visible in a database prior to its outcome being know. Some or all of the changes associated with transaction may be made durable and visible. If the transaction is aborted, the durable and visible changes must normally be reversed.

Transaction Manager—A facility for ensuring that transactional updates to a database maintain the ACID properties.

Change Queue—A sequential list of all changes made to a database.

Change Log—A form of a change queue.

Transaction Log—A file of all changes made to a database by a transaction manager. A transaction log is one example of a change queue. In this specification, the term "transaction log" is to be interpreted as "change queue."

Data Replication—The propagation of changes from a source database to a target database or to a target application intended to keep the target database or target application in synchronization with the source database. Replication is often accomplished at the transaction level.

Data Replication Engine (interchangeably referred to herein as "replication engine")—A facility for replicating source database changes to a target database or to a target application.

Extractor—A data replication engine component that reads database changes from a change queue and sends them to the target system over a communication channel.

Applier—A data replication engine component that receives changes made to a source database and applies them to a target database or sends them to a target application.

Replication Latency—The time from when a database change is applied to a source database to the time that it is applied to the target database.

Asynchronous Replication—A data replication method in which data is replicated after it has been applied to the source database. The target database will lag the source database by the replication latency of the replication engine.

Synchronous Replication—A data replication method in which data is replicated to the target database in synchronism with the updates to the source database. Replication latency is zero.

Bidirectional Data Replication—Replicating data between two systems in both directions. If a change is made to the database of either system, it is replicated to the other system.

Application Latency—The time that an application is delayed due to synchronous replication in which the source system must wait for changes to be applied to the target system before it can complete its change operation.

Commit Latency—The time from when the source application issues a commit request to the time that the transaction is committed at any given system.

Hung Transaction—At the target system, a partially received transaction for which the commit/abort completion status is unknown.

Transaction Profile and Transaction Pattern—refer to the same concept herein and encompass the information needed to recognize with a degree of confidence that a particular transaction has been observed before. Such information may include transaction attributes, such as the individual transaction steps or operations and their order, intervals between steps, user name, terminal, application, or time of day associated with the transaction. Also associated with information is a metric of occurrence, such as the number of transactions matching the specified attributes, that can be used to compute a probability that a given transaction is one that is in the class of transaction represented by the transaction profile.

Transaction Pattern Identification Engine (TPID)—A system for monitoring the probability of occurrences of transactions and for reporting those probabilities in response to a query. The TPID maintains transaction patterns and associated metrics of occurrence of transaction patterns in a transaction pattern or probabilities table.

TPID—See Transaction Pattern Identification Engine

Transaction Probabilities Table—Also referred to as a Transaction Pattern Table or Transaction Profile Table, is the table of transaction patterns and probabilities prepopulated, or built on-the-fly and maintained, such as by a TPID. The Transaction Probabilities Table contains transaction patterns and corresponding metrics of occurrence. Pre-population of the Transaction Probabilities Table may occur by a compiler, historical data, user knowledge, or other source. Each record or row of the table is uniquely or distinctively identified by a transaction pattern identifier. Such transaction pattern identifier can be the primary key, or an alternate key or other locator for rows of the table.

Transaction Category—A grouping of transactions based upon a shared transaction profile or pattern. A transaction belongs to a Transaction Category if it matches the set of attributes associated with the transaction pattern.

BRIEF DESCRIPTION OF THE DRAWINGS

The foregoing summary as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 1 shows the prior art organization of a computer application.

FIG. 2 shows the prior art asynchronous replication of data from a source application to a target system.

FIG. 3 shows the prior art asynchronous replication of data from a source database to a target system.

FIG. 4 shows the prior art use of Network Transactions for the synchronous replication of data from a source application to a target system.

FIG. 5 shows the prior art use of Coordinated Commits for the synchronous replication of changes from a source database to a target database.

FIG. 6 shows the prior art completion of synchronously replicated transactions using Coordinated Commits.

FIG. 7 illustrates the prior art hung transaction caused by a network failure.

FIG. 8 illustrates the prior art hung transaction caused by a source-system failure.

FIG. 9 illustrates the prior art commit latency.

FIG. 10 shows a transaction probability profile in which each transaction incorporates a different set of changes.

FIG. 11 shows a transaction probability profile in which transactions have different commit delays.

FIG. 12 shows the architecture of a Transaction Pattern Identification Engine (TPID).

FIG. 13 shows the general structure of a Transaction Probabilities Table.

FIG. 14 shows the processing flow of the Monitor within a TPID.

FIG. 15 shows the processing flow of the Query Processor within a TPID.

FIG. 16 shows the reasons a hung transaction can occur under asynchronous replication.

FIG. 17 shows the reasons a hung transaction can occur under synchronous replication.

FIG. 18 shows an embodiment of a method to resolve hung transactions using a target-side TPID accessible to the Applier.

FIG. 19 shows an embodiment of a method to resolve hung transactions using a TPID that is inserted between the communication channel and the Applier.

FIG. 20 shows an embodiment of a method to resolve hung transactions using a TPID that is an integral component of the Applier.

FIG. 21 shows an embodiment of a method to reduce commit latency with a source-side TPID available to the Extractor.

FIG. 22 shows an embodiment of a method to reduce commit latency using a TPID that is an integral component of the Extractor.

FIG. 23 shows an embodiment of a method to reduce application latency in a synchronously replicated environment.

FIG. 24 illustrates how hung transactions can be resolved and commit latency reduced by replicating the probability of transaction completion with each change.

FIG. 25 illustrates how hung transactions can be resolved and commit latency reduced by periodically replicating the Transaction Probabilities Table.

DETAILED DESCRIPTION OF THE INVENTION

Certain terminology is used herein for convenience only and is not to be taken as a limitation on the present invention.

An overall purpose of the present invention is to provide a method for a system with the ability to determine the probability that given transaction matches a class of transactions. Such a method can be used, for example to determine that the given transaction has completed all database operations before the system actually receives a completion directive. If the transaction has seen all of the operations that the class of transaction has seen and if the probability that the transaction matches the class of transactions is sufficiently high, the transaction can be processed with a comfortable degree of certainty that it has, in fact, completed. While the remainder of the document discusses the method in regards to determining if the transaction has completed, the same method can be used in other situations requiring the classification of transactions.

Transaction Probabilistic Model

Large, real-time applications typically perform the same processing functions repeatedly, often at a rate of hundreds of transactions per second. Although different event types may require different transaction formats, events of the same type will be processed via substantially the same transaction. However, a specific transaction may occasionally be modified for special circumstances.

Consider a balance transfer in a banking application. A typical transaction will update two accounts. One account will be debited, and the other account will be credited with the same amount. Thus, the transaction will involve updates to two rows in specific tables. On rare occasions, however, the debit of one account might result in an overdraft. In this case, a third operation will be required. An insert must be made into an overdraft table so that an overdraft charge can be applied against the debited account. Assume that one out of every one hundred balance transfers results in an overdraft charge. Two updates will comprise 99% of all transactions of this type, and two updates and one insert will comprise 1%. If the system sees a transaction that updates two accounts, processing decisions such as pre-committing the transaction or resolving a hung transaction can be made based upon a 99% confidence level that the system has seen the entire transaction.

This process is illustrated in FIG. 10, which shows the probability distribution of four transactions. In this example, transaction TP1 consists of just an Insert into Table A and has occurred 22,830 times. Transaction TP2 consists of an Insert into Table A followed by an Update to Table B. This transaction has occurred 195,203 times. Transaction TP3 consists of an Insert into Table A, an Update to Table B, and a Delete from Table C. TP3 has occurred 10,274 times. Transaction TP4 consists of an Update to Table D and an Insert into Table A. It has occurred 105,657 times.

To use the Transaction Probabilities Table, the sequence of transaction updates is followed through the table; and a probability of a complete transaction is calculated after each update. If the probability of a transaction pattern is sufficiently high, the transaction can be considered "probably" complete and treated as such.

In the example of FIG. 10, if the first update of a transaction is Insert into Table A, it might be a TP1, TP2, or TP3 transaction. Since only an Insert into Table A has been received, which would be transaction TP1, the probability that this is a complete TP1 transaction is computed. This probability is the number of occurrences of TP1 divided by the number of occurrences of all transactions that begin with Insert into Table A (transactions TP1, TP2, and TP3), or 22,830/(22,830+195,203+10,274)=10%. Therefore, it is unlikely that this is a TP1 transaction. (If the next update is a commit transaction, then this was indeed a TP1 transaction.)

If the next update is Update Row in Table B, this may be a TP2 transaction. However, TP3 also begins with this sequence. The probability that this is a TP2 transaction is 195,203/(195,203+10,274)=95%. Therefore, with a high degree of probability, the transaction can be considered as a complete TP2 transaction and processed as such.

If this sequence is followed by a commit transaction, the choice of TP2 was correct. However, if this sequence is followed by a Delete from Table C operation, this transaction was, in fact, a TP3 transaction.

Another example of similar transactions with different characteristics is shown in FIG. 11. This example is similar to that of FIG. 10 for TP1 and TP2 in that each transaction begins with an Insert into Table A. TP1 commits quickly. However, the commit of TP2 is delayed by a time of 500 msec. before the insert into Row C is made. TP1 has occurred 195,203 times; and TP2 has occurred 10,274 times. In this case, if the commit has not occurred within several milliseconds, it is reasonable to conclude that the transaction is TP2 and that it cannot be processed as a TP1 transaction.

In addition to tracking insert/update/delete changes in a transaction, the probabilistic model can consider other transaction activity such as the use of foreign keys.

Transaction Pattern Identification Engine (TPID)

A preferred embodiment of the invention includes a Transaction Pattern Identification Engine (TPID), shown in FIG. 12. It comprises a TPID Monitor (1), a Transaction Probabilities Table (2), and a TPID Query Processor (3).

Transaction Probabilities Table

Typical contents of the Transaction Probabilities Table is indicated in FIG. 13. For each transaction, it may contain a transaction identification, the sequence of database changes that comprise that transaction, and the number of times that the transaction has been observed since the table was created. The transaction counts may be used to calculate the probability that each transaction sequence is a completed transaction, as described in the section entitled "Transaction Probabilistic Model". Alternate embodiments allows the probability percentages to be prepopulated by a user, compiler, historical archive, or other source.

The Transaction Probabilities Table may also contain additional attributes that help to distinguish transactions. For instance, it might list the typical users, process IDs, or terminals that initiate the transactions. It might indicate the typical time of day that the transaction is initiated or its typical priority. All of these attributes can help to determine if a given set of updates represents a completed transaction with a high degree of certainty.

TPID Monitor

The TPID Monitor is a process (a computer program) that monitors the transaction stream. Its processing logic is shown in FIG. 14. The TPID Monitor monitors the transaction stream (1), analyzing each change or transaction directive in the stream. When it finds a begin transaction directive (2), it continues to monitor the transaction stream for changes for that transaction (3). Each change for that transaction is entered into the change pattern for the transaction (6).

If the TPID Monitor receives an abort for the transaction (4), it terminates the building of a pattern for that transaction and returns to monitoring the transaction stream (1). It if finds a commit for the transaction (5), it checks its Transaction Probabilities Table to see if the transaction pattern exists (7). If the pattern does not exist, it enters the pattern into the Transaction Probabilities table (8). If the pattern exists, it increments the occurrence counter, or other metric of occurrence, for that transaction (9).

The processing flow shown in FIG. 14 is that for one particular transaction. There are, in fact, many transactions in progress simultaneously; and this processing flow is applied to each transaction in progress.

The TPID Transaction Probabilities Table may be continuously updated by the TPID Monitor. Alternatively, the TPID Monitor may be run once against a representative sampling of transactions to create the TPID Transaction Probabilities Table. As an alternative to using the TPID Monitor, it may be possible in advance to establish rules based upon knowledge of the application. In this case, the Transaction Probabilities Table can be a hard-coded table and no TPID Monitor is required to generate it or keep it updated.

TPID Query Processor

The TPID Query Processor is a process that responds to queries requesting the probability that the current transaction is a complete transaction. An example of its processing flow is shown in FIG. 15.

The Query Processor is passed a sequence of changes (the query pattern) that has occurred so far in a currently active transaction (1). The Query Processor searches the Transaction Probabilities Table to find the transaction category, or a subset of transaction categories, that match the query pattern (2). It then produces a measurement representing the likelihood that the incomplete transaction belongs to each category of transaction corresponding to the each matched query pattern using the metric of occurrence associated with each transaction category. For example, to compute the measurement it might divide the number of occurrences (in this case, the metric of occurrence) for the submitted pattern by the sum of all occurrences for transaction patterns that begin with the submitted pattern (3) to obtain the probability that the submitted pattern is a completed transaction. This probability, or subset of probabilities, is returned in response to the query (4). Note that the incomplete transaction may not match any pattern in the Transaction Probabilities Table. In this case, the Query Process will return a status of no matches (or equivalent) which the requestor will have to process. If, for example, the TPID is being used to determine if the transaction has been completed, the transaction would be categorized as incomplete as its status is unknown.

Non-Static Applications

Not all applications retain the same transaction mix over their life cycles. For instance, a real-time application may use one set of transactions during the day to support real-time services and switch to batch processing at night. The batch-processing activity will use different transactions than those used by the real-time services. To accommodate these time-based differences, either the time of day can be included in the Transactions Probabilities Table or a different Transaction Probabilities Table can be used based upon the time of day or transaction mix. For example, the start of batch processing may swap out the real-time services Transaction Probabilities table and swap in the batch operations Transaction Probabilities; when batch processing is completed, the real-time services Transaction Probabilities table may be swapped back in.

To accommodate this and other reasons for changes in the transaction mix, the Transaction Probabilities Table may be updated occasionally. One way to do this is to periodically build a new table in the background by monitoring the transaction mix while continuing to use the currently active Transaction Probabilities Table for classifying the transaction. After the new table has grown statistically stable, it can be placed into service as the active Transaction Probabilities Table. The construction of yet another table can now begin. In this way, if transaction probabilities change over time, the TPID will keep up with the new distributions.

Other Embodiments

The embodiment of the TPID engine depicted in FIG. 12 through FIG. 15 is for illustrative purposes of one embodiment. The TPID engine can be implemented in numerous ways. The Monitor and Query Processor can be incorporated into a single process. The Monitor can be in a different system from the Query Processor. The entire TPID engine may be in a separate processor from either the source or target systems. As mentioned above, the Monitor can be eliminated altogether if the transaction frequencies are known in advance. In this case, the probabilities can be pre-computed and stored in the TPID table. There are many other ways that the TPID engine may be implemented and still perform the functions of the TPID engine described above.

Correcting Erroneous Decisions

If an initial series of changes within a transaction represents with a high probability a completed transaction, there is still a non-zero probability that it is not a completed transaction. For instance, with respect to FIG. 10, if the first changes in a transaction are an insert into Table A followed by an update to Table B, the probability that this is the complete transaction TP2 is 95%. A decision can be made to take action based on the fact that it is, in fact, a TP2 transaction. This decision will be correct 95% of the time, but it will be wrong 5% of the time.

Consequently, some transactions that were pre-committed may continue with additional changes before they actually commit. In addition, transactions that were pre-committed may be later aborted. Also, with respect to hung transactions, a decision to abort a hung transaction may be in error, as the transaction may have actually committed on the source system and vice versa.

Premature Commits

If a committed transaction is erroneously pre-committed by the target system, further changes within the scope of the original source transaction can be bundled into a new transaction and committed. The result is that all changes in the original transaction are committed. This situation can be encountered when an attempt is made to reduce application latency due to commit latency.

Erroneous Commits and Aborts

If a transaction is pre-committed on the target and is then aborted by the source system, the target system has committed some changes that were not committed on the source. These changes need to be reversed to bring the target system into conformance with the source system. This can be accomplished by applying the remaining changes, including the rollback changes, from the source system and committing them on the target system.

The same issues can occur when resolving hung transactions. If the source system becomes available, the hung transaction resolutions can be reviewed and processed based upon the outcome of the source system. Correcting such erroneous decisions is made difficult because ongoing transaction activity on the target system may have further modified the data in question.

Decisions must be made as to whether to update a data object with prior transaction activity or to leave its state untouched because it has been modified by subsequent transaction activity and is now correct. Shadowbase Undo and Redo, utilities in the Shadowbase suite of products, can accomplish these tasks. As an example for how to accomplish these tasks, see U.S. Pat. No. 8,909,604 (Holenstein et al.) entitled "Methods for returning a corrupted database to a known, correct state by selectively using redo and undo operations."

Integrating the TPID Engine

There are many ways to incorporate the TPID Engine into systems to help resolve hung transactions and to reduce application latency due to commit latency. Some embodiments are suitable for resolving hung transactions, some for reducing commit latency, and some for providing both services.

Resolving Hung Transactions

As discussed earlier in the section entitled "Hung Transactions", the TPID can be used to determine whether a partially completed transaction at the target system should be committed or aborted following a source-system or network failure. The target system queries the TPID for the probability that the transaction is a complete transaction. If the probability is sufficiently high, the target system will commit the transaction. Otherwise, it will abort the transaction.

Hung-Transaction Failure Points

There are several points in the processing of a transaction where a replication failure can take place. Replication can fail if the source system fails, if the replication network interconnecting the source and target systems fails, or if the replication engine fails.

FIG. 16 and FIG. 17 illustrate the various steps involved in the processing of an incomplete transaction using the categorization of the incomplete transaction provided by the TPID Query Processor. The figures indicate where replication failure points might occur. At each failure point, a strategy for handling the transaction by using the categorization of the incomplete transaction provided by the TPID Query Processor is described.

FIG. 16 shows the steps involved in the replication of a transaction using asynchronous replication. When a transaction is begun at the source system, a Begin Transaction token is placed into the change queue by the source transaction manager. The token is replicated to the target system, and the target system will begin an independent transaction to receive database updates from the source system. Should replication fail following the receipt of the Begin Transaction token (failure point 1), the target system processing will ignore the transaction. Alternatively, there may be no Begin Transaction token sent through the replication channel. Instead, the target system processing will infer the beginning of the transaction from the first database update that it receives for that transaction.

As database updates are received at the target system, they are applied to the target database. Should the replication channel fail during this process (failure point 2), the target system processing has no idea whether it has received all updates or whether the transaction has completed at the source system. This is a hung transaction. The target system processing can decide whether to commit or abort the transaction based on a metric of occurrence such as the transaction's probability of occurrence, as found in the TPID Table.

When the transaction commits or aborts at the source system, the source transaction manager inserts a commit or abort token into the change queue. The token is replicated to the target system, which will commit or abort the transaction as indicated. Should the replication channel subsequently fail (failure point 3), no action is required.

FIG. 17 shows the steps involved in the replication of a transaction using synchronous replication. In this case, the replication engine has registered with the source transaction manager so that the source transaction manager can communicate directly with the replication engine, as described in the section entitled "Coordinated Commits". Not only can the source system replicate data to the target system via the change queue, but the source transaction manager also can communicate directly with the replication engine via "out-of-band" signals that do not have to go through the delays of the replication channel.

When a transaction is begun at the source system, the replication engine joins the transaction. The target system is informed of the beginning of the new transaction by a Begin Transaction token inserted into the change queue. In addition, the source transaction manager may send an out-of-band signal to the target system, notifying it of the new transaction. Should the replication channel fail after the target system has been informed of the new transaction (failure point 1), the target system processing will ignore the transaction. (In some systems, there is no begin-transaction indication sent to the target system. Rather, the target system processing infers the beginning of a transaction from the first database update for that transaction.)

Updates are then replicated to the target system via the change queue. If the replication channel fails during this process (failure point 2), the target system processing does not know whether it has received all updates or whether the source system has committed or aborted the transaction. This is a hung transaction. The target system processing can resolve the probable disposition of the transaction based on its probability of being a complete transaction, as indicated by the categorization of the incomplete transaction, and can commit or abort the transaction accordingly.

When all updates have been replicated, the source transaction manager will send a Ready to Commit? (RTC?) request to all resources involved in the transaction. It the target system has safe-stored or applied all of the database updates, it will respond with a "yes" vote. Otherwise, it will respond with a "no" vote. If the replication channel fails before the target system can respond to the RTC? request with its vote or fails immediately thereafter (failure point 3), the target system processing does not know the ultimate disposition of the transaction at the source system. If its vote was "yes," this is a hung transaction; and the target system processing can use the TPID probability of completion to decide whether to commit or abort the transaction. If the target system's vote was "no," it must abort the transaction.

When all resources have voted, the transaction manager decides whether to commit or to abort the transaction. It inserts a commit or abort token into the change queue and sends a commit/abort signal to all of the resources involved in the transaction, including the target system. The target system will commit or abort the transaction as directed. If the replication channel fails after the target has received the commit/abort signal (failure point 4), the target system processing takes no action since it has already committed or aborted the transaction. It sends a Forgotten signal to the source system transaction manager to indicate that it has successfully processed the transaction. If the replication channel should fail following the send of the Forgotten signal (failure point 5), the target system processing need take no action.

Ultimately, the commit/abort token will be received by the target system. However, the target system processing has already committed or aborted the transaction and takes no further action. Should the replication channel fail after this (failure point 6), there is no processing action needed on the part of the target system.

Though the target system processing need take no action following failure points 4, 5, and 6, the source system does not know how the target system processed the transaction. So far as it is concerned, the state of the transaction at the target system is in doubt. If the source system processing can determine the point of replication failure, it can determine the probable state of the target transaction by consulting a TPID table if it has maintained one.

The above strategies reflect several examples that the target system processing can use to determine whether to commit or abort a hung transaction by using the TPID engine. Other strategies can be used with the TPID engine to accomplish the same task. For example, both batch and online transactions may update the same table. The target system processing may be configured to always apply the batch transactions' data since many batch transactions are restartable. However, it will not apply online transactions unless all of the updates have been received or unless the transaction has been committed.

Another example of an alternate strategy has to do with the actions of the target system under synchronous replication (FIG. 17). If the target system had received an RTC? signal and had decided to vote "yes," and if the replication channel failed at that point (failure point 3), the target system processing might have committed the transaction anyway under the assumption that transactions usually commit with a high probability.

A number of embodiment variations follow.

Embodiment 1: Resolving Hung Transactions with a Target-Side TPID

FIG. 18 shows a TPID configuration that the target system processing can use to resolve a hung transaction. It comprises a TPID that is fed by the replication engine Applier and that can be queried by the Applier.

The Applier on the target system maintains the TPID. As changes to a transaction are read from the source system's change queue (1) by the data replication engine's Extractor (2), they are sent over a communication channel (3) to the Applier (4). The Applier feeds each change (5) to the TPID (6). The TPID will identify the possible transactions to which the change belongs and will select the range of transactions in its probability table that are candidates for the complete transaction. The Applier will also apply the change to the target system (7).

When a commit directive is received, the TPID will increment the occurrence count for the completed transaction.

Should the source system or the network fail, the target system will be left with unfinished, or hung, transactions (those for which neither a commit directive nor an abort directive have been received). For each such transaction, the Applier queries the TPID (8) for the categorization of the incomplete transaction and determines the probability that an unfinished transaction has received and applied all of its associated database changes. If the probability is sufficiently high, the target system processing will commit it. If not, the target system processing will abort the transaction.

Embodiment 2: Resolving Hung Transactions with an In-Line TPID

FIG. 19 illustrates an alternative embodiment for the incorporation of a TPID to resolve hung transactions. Its operation is similar to that described in "Embodiment 1: Resolving Hung Transactions with a Target-Side TPID" except that the TPID (2) is placed between the communication channel (1) and the Applier (4). The TPID receives all changes from the communication channel (3) and uses them to update its occurrence count of transactions. It passes the changes to the Applier (5) for normal replication processing.

Alternatively, the communication channel can pass the changes simultaneously to the TPID and to the Applier.

Should the source system or the network fail, the Applier can query the TPID for the probability that each hung transaction is a complete transaction (6) and can decide whether or not to commit the transaction.

Embodiment 3: Resolving Hung Transactions with a Built-In TPID

FIG. 20 shows yet another TPID configuration for resolving hung transactions. Its operation is similar to that described in "Embodiment 1: Resolving Hung Transactions with a Target-Side TPID" except that the TPID is included as an integral part of the Applier. As the Applier (2) receives changes from the communication channel (1), it follows the changes in the transaction and updates the occurrence count in its internal Transaction Probabilities Table when a commit is received.

Should the source system or network fail, the Applier queries its internal Transaction Probabilities Table for each hung transaction to determine whether to commit or abort it.

Commit Latency

As described in the section entitled "Commit Latency", there may be a significant delay from the time that the last change for a transaction is read from the change queue by the data replication engine's Extractor to the time that the Extractor reads the commit token. This delay, known as commit latency, causes the target system to hold locks on data objects longer than is necessary, thereby slowing the target system.

Embodiment 4: Reducing Commit Latency with a Source-Side TPID

Shown in FIG. 21 for the source system is one TPID configuration that can be used to reduce application delays due to commit latency. During normal replication, changes are read from the change queue (1) by the data replication engine's Extractor (2). The changes are sent over the communication channel (3) to the Applier (4), which applies the changes to the target system (5).

The Extractor also feeds the changes to the TPID (6). As each change is fed to the TPID, the Extractor queries the TPID as to the probability that the transaction has completed (7). If the probability is high enough, the Extractor sends a pre-commit directive to the target system (8) so that the target system can commit the transaction and release its locks on the data objects that are being updated.

Should further changes for the pre-committed transaction be received, they are bundled into a new transaction and are applied to the target system. When the full transaction actually completes, the additional changes are committed; and the occurrence count for the full transaction is implemented.

Embodiment 5: Reducing Commit Latency with a TPID Intercept Library

FIG. 22 illustrates a modification of the configuration shown in FIG. 21. Instead of the Extractor communicating with the TPID via messaging or an API (application programming interface), an intercept library (1) is incorporated into the Extractor. The intercept library captures all changes sent by the Extractor and forwards them to the TPID (2), (3) to facilitate building the Transaction Probabilities Table and to the communication channel (4) for replication to the target system (5).

Similar to the previously described embodiment in FIG. 21, the intercept library queries the TPID as each change is processed (6) to determine if the probability of the transaction being complete is high enough to pre-commit it. If this is the case, the intercept library sends a pre-commit to the target system (7).

Should further changes for the pre-committed transaction be received, they are bundled into a new transaction and are applied to the target system. When the full transaction actually completes, the occurrence count for the partial transaction is decremented; and the occurrence count for the full transaction is implemented.

The advantage of using an intercept library is that such libraries can be incorporated into applications without requiring any code changes. Thus, by designing an appropriate intercept library, the use of a TPID to reduce commit latency can be implemented with no code changes to the data replication engine or to the source application. In this embodiment, the TPID may either be integrated into the intercept library or implemented as a separate process.

Embodiment 6: Reducing Commit Latency with a Target-Side TPID

The target system can be implemented with a TPID as shown in FIG. 18, FIG. 19, and FIG. 20. If this is done, the target system can monitor transactions that it is applying to the target database and can determine the probability that the transaction in progress is, in fact, a complete transaction. If the probability is sufficiently high, the target system can pre-commit the transaction.

Should further changes for the pre-committed transaction be received, they are bundled into a new transaction and are applied to the target system. When the full transaction actually completes, the occurrence count for the full transaction is implemented.

Embodiment 7: Reducing Application Latency in a Synchronous Replication Environment The embodiments shown in FIG. 21 and FIG. 22 are applicable to an asynchronous replication environment. FIG. 23 illustrates a TPID integrated into a Coordinated Commits synchronous replication engine. The Coordinated Commits synchronous replication engine is described in the section entitled "Coordinated Commits".

The Coordinated Commits synchronous replication engine uses an asynchronous replication engine to replicate changes. However, the replication engine joins the transaction so that it is a voting member at commit time. Coordinated Commits will commit the transaction if all voting members vote "yes," but it cannot do so until the target system is signaled to commit the transaction or until the commit token is passed through the replication channel to the target system. This is commit latency and may involve a significant delay from the time that the source application issued the last change for the transaction. Commit latency adds to application latency, slowing down the target system.

To reduce the impact of commit latency, FIG. 23 shows a modified Coordinated Commits replication engine. When it is informed by the source application that a new transaction has begun, the replication engine makes a request to the transaction manager to join the transaction (1). During the transaction, the source application makes changes to its database (2a). These changes are entered into the change queue (2b).

The Extractor of the asynchronous replication engine fetches the changes from the change queue (2c) and feeds them to its TPID (3). It also queries the TPID as to the probability that the transaction has completed (4). It then passes each change to the Applier along with the probability that the transaction has completed (5).

When the source application issues a commit directive (6), the transaction manager will send a Ready to Commit? (RTC?) query (7a) to the replication engine. The query is received by the Extractor. The Extractor will query the target system to see if it is ready to commit (7b). The target system will use the probability of a complete transaction sent with the last change to determine if it is likely that it has the entire transaction. If so, it will notify the Extractor that it is ready to commit, and the Extractor will send a "yes" vote to the transaction manager (8).

If the target system is not prepared to commit based on the current probability of the transaction, it will wait until it receives a further change with a sufficiently high probability. The target system can now reply that it is ready to commit, and the Extractor will issue its "yes" vote.

When all resources have voted "yes," the transaction manager will signal the replication engine that the transaction can be committed and will insert a commit token into the change queue (9) to be replicated to the target system. Afterwards, the transaction manager will inform the source application that the transaction has committed (10).

The time from when the source application issues a commit request to the time that it takes for the last update to propagate to the target system can be significant. This is the commit latency, and it adds to application latency, slowing down both the source and target systems. If the target system can respond by pre-committing the transaction, commit latency can be reduced; and the operation of the systems can be improved.

Embodiment 8: Reducing Commit Latency on the Source System

Embodiments 4 through 7 have focused on reducing commit latency on the target system. However, embodiments 4 through 6 also can be used to reduce commit latency on the source system. When the source system decides to pre-commit the transaction on the target system, it can begin its own prepare processing so that if a commit is issued, it has partially completed its commit processing. If further updates are received, it can reinitiate its prepare processing.

Alternatively, the source system can pre-commit the transaction on the source database as well as on the target database. As on the target system, if further updates for the transaction are received, they can be bundled into a new transaction and applied to the source database. However, if the transaction is aborted after the source-side pre-commit, means similar to those on the target system must be provided to back out the pre-committed transaction (see the section entitled "Correcting Erroneous Decisions").

Combining Hung-Transaction Resolution and Application-Latency Reduction

A modification to the commit-latency reduction embodiments shown in FIG. 21 and FIG. 22 can allow the target system to also resolve hung transactions. This is, in fact, implemented in the synchronous replication embodiment illustrated in FIG. 23 and described in the previous section entitled "Embodiment 7: Reducing Application Latency in a Synchronous Replication Environment".

As shown in FIG. 24, one method is to send the probability of a completed transaction with each replicated change (1) to the Applier (2) at the target system. In this way, if the source system or network should fail, the target system knows the probability of completion for each of its hung transactions and can make the appropriate decisions as to whether to commit or to abort each transaction.

An alternative method to combine hung-transaction resolution and commit-latency resolution is to replicate the Transaction Probabilities Table periodically from the source system to the target system so that the target system has access to transaction probabilities for hung-transaction resolution (FIG. 25).

In each of the FIGS. 18-23 and FIG. 25, the combination of the extractor and applier provide for the basic components of a "data replication engine."

In order to replicate the table, all that needs to be done is for the source system to write the table (1) to the change queue (2). The replication engine Extractor (3) will read the contents of the table from the change queue and will send the contents over the communication channel (4) to the Applier (5). The Applier will apply the newly replicated table (6) to its copy of the Transaction Probabilities Table (7).

Should the source system or the network fail, the Applier can resolve a hung transaction by sending a query (8) to its local copy of the TPID Query Processor (9) to obtain the probability that the hung transaction has completed. It can then make a commit/abort decision based on that probability.

The Transaction Probabilities Table is fairly static and need not be replicated frequently. If the table is refreshed occasionally to account for changes in transaction patterns, each new table can be replicated to the target system as the table is being put into service at the source system.

SUMMARY

Two challenges that occur in transaction-processing systems using data replication are hung transactions and commit latency. A hung transaction is a partially received replicated transaction for which replication was not completed due to a source-system or network failure. Commit latency is the time delay from when the source application issues a commit request for a transaction until the time that the transaction is actually committed at the target system.

The problem with hung transactions is that there is currently no way to determine whether the target system should commit or abort the transaction. The problem with commit latency is that it slows down the applications at both the source and target systems.

Both of these challenges can be substantially mitigated by the use of a Transaction Pattern Identification Engine (TPID). The TPID monitors transaction flows and categorizes the incomplete transactions using a metric of occurrence of the transaction pattern for each transaction table subset, for instance, by calculating the probability that any given sequence of changes is a complete transaction.

By incorporating a TPID into the target system, the target system can query the TPID to determine the probability that a hung transaction is a complete transaction. If this probability is sufficiently high, the target system can commit the transaction. Otherwise, it can abort it.

By integrating a TPID into the source system, the source system can monitor transaction flow and can pre-commit transactions when it appears that the transaction has most likely completed. This eliminates the delay caused by waiting for the transaction manager to commit the transaction, a wait that may be substantial in many cases.

By using a TPID at the source system and sending the probability of a complete transaction with each change that is replicated to the target system, both goals may be achieved. The source system can determine when to pre-commit a transaction. The target system knows the probability of completion of each partially received transaction so that it can resolve hung transactions following a source-system or network failure.

An alternative method to achieve a consolidated solution to hung transactions and commit latency is to position the TPID on the source system and to periodically replicate the Transaction Probabilities Table to the target system. In this way, the source system can determine pre-commits; and the target system will have access to the transaction probabilities required to resolve hung transactions.

The present invention may be implemented with any combination of hardware and software. If implemented as a computer-implemented apparatus, the present invention is implemented using means for performing all of the steps and functions described above. When implemented in software, the software code can be executed on any suitable processor or collection of processors, whether provided in a single computer or distributed among multiple computers.

The present invention can also be included in an article of manufacture (e.g., one or more computer program products) having, for instance, non-transitory, tangible computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of fully processing an incomplete transaction,
wherein transactions are completed within a transaction processing system, and wherein the transactions are replicated from a source database to a target database by a replication engine, and wherein each transaction is a series of one or more transaction steps or operations, and wherein the incomplete transaction is incomplete in either the source or the target database, the method comprising:
(a) providing a transaction pattern table that includes a plurality of records, each record being defined by a transaction pattern identifier, each record including:
(i) a transaction pattern, wherein each completed transaction is the series of one or more transaction steps or operations, and the transaction pattern includes the series of one or more transaction steps or operations of the completed transaction, and
(ii) a metric of occurrence of the transaction pattern, the plurality of records in the transaction pattern table thereby encompassing information needed to recognize with a degree of confidence that the incomplete transaction has been observed before;

(b) automatically comparing in a computer processor the series of one or more transaction steps or operations of the incomplete transaction to the transaction patterns in the transaction pattern table, wherein the incomplete transaction is a transaction that has been started but has not been committed or aborted;

(c) identifying in the computer processor, based on the automatic comparison, a subset of transaction patterns in the transaction pattern table that are potential candidates for matching the incomplete transaction, the subset of transaction patterns belonging to a range of transactions in the transaction pattern table that are candidates for the completed transaction;

(d) categorizing in the computer processor the incomplete transaction using the metric of occurrence of the transaction pattern for each transaction pattern in the subset of transaction patterns, Wherein the categorizing predicts when all of the series of one or more transaction steps or operations which have completed in the source database have been replicated by the replication engine;

(e) committing the incomplete transaction within the transaction processing system when the prediction in step (d) indicates that all of the series of one or more transaction steps or operations which have completed in the source database have been replicated by the replication engine; and (f) processing any additional transaction steps or operations which have completed in the source database for the committed incomplete transaction as a new transaction applied to the target database, thereby fully processing the incomplete transaction within the transaction processing system.

2. The method of claim 1 wherein one or more of the transactions patterns include o or more attributes which are used in the comparison step (b).

3. The method of claim 2 wherein one of the attributes is a process ID.

4. The method of claim 1 wherein the incomplete transaction is incomplete in the target database.

5. A tangible computer program product for fully processing an incomplete transaction, wherein transactions are completed within a transaction processing system, and wherein the transactions are replicated from a source database to a target database by a replication engine, and wherein each transaction is a series of one or more transaction steps or operations, and wherein the incomplete transaction is incomplete in either the source or the target database, the computer program product comprising non-transitory computer-readable media encoded with instructions for execution by a processor to perform a method comprising:

(a) providing a transaction pattern table that includes a plurality of records, each record being defined by a transaction pattern identifier, each record including:
  (i) a transaction pattern, wherein each completed transaction is the series of one or more transaction steps or operations, and the transaction pattern includes the series of one or more transaction steps or operations of the completed transaction, and
  (ii) a metric of occurrence of the transaction pattern, the plurality of records in the transaction pattern table thereby encompassing information needed to recognize with a degree of confidence that the incomplete transaction has been observed before;

(b) automatically comparing the series of one or more transaction steps or operations of the incomplete transaction to the transaction patterns in the transaction pattern table, wherein the incomplete transaction is a transaction that has been started but has not been committed or aborted;

(c) identifying, based on the automatic comparison, a subset of transaction patterns in the transaction pattern table that are potential candidates for matching the incomplete transaction, the subset of transaction patterns belonging to a range of transactions in the transaction pattern table that are candidates for the completed transaction;

(d) categorizing the incomplete transaction using the metric of occurrence of the transaction pattern for each transaction pattern in the subset of transaction patterns, wherein the categorizing predicts when all of the series of one or more transaction steps or operations which have completed in the source database have been replicated by the replication engine;

(e) committing the incomplete transaction within the transaction processing system when the prediction in step (d) indicates that all of the series of one or more transaction steps or operations which have completed in the source database have been replicated by the replication engine; and (f) processing any additional transaction steps or operations which have completed in the source database for the committed incomplete transaction as a new transaction applied to the target database, thereby fully processing the incomplete transaction within the transaction processing system.

6. The computer program product of claim 5 wherein one or more of the transactions patterns include one or more attributes which are used in the comparison step (b).

7. The computer program product of claim 6 wherein one of the attributes is a process ID.

8. The computer program product of claim 5 wherein the incomplete transaction is incomplete in the target database.

9. An apparatus for fully processing, an incomplete transaction, wherein transactions are completed within a transaction processing system, and wherein the transactions are replicated from a source database to a target database, and wherein each transaction is a series of one or more transaction steps or operations, and wherein the incomplete transaction is incomplete in either the source or the target database, the apparatus comprising:

(a) a transaction pattern table that includes a plurality of records, each record being defined by a unique transaction pattern identifier, each record including:
  (i) a transaction pattern, wherein each completed transaction is the series of one or more transaction steps or operations, and the transaction pattern includes the series of one or more transaction steps or operations of the completed transaction, and
  (ii) a metric of occurrence of the transaction pattern, the plurality of records in the transaction pattern table thereby encompassing information needed to recognize with a degree of confidence that the incomplete transaction has been observed before;

(b) a transaction pattern identification engine configured to:
  (i) compare the series of one or more transaction steps or operations of the incomplete transaction to the transaction patterns in the transaction pattern table,
  (ii) identify, based on the comparison, a subset of transaction patterns in the transaction pattern table that are potential candidates for matching the incomplete transaction, the subset of transaction patterns belonging to a range of transactions in the transaction pattern table that are candidates for the completed transaction, and (iii) categorize the incomplete transaction using the metric of occurrence of the transaction pattern for each transaction pattern in the subset of transaction patterns, wherein the categorizing predicts when all of the series of one or more transaction steps or operations which have completed in the source database have been replicated by the replication engine, wherein the incomplete transaction is a transaction that has been started but has not been committed or aborted; and (c) a computer processor configured to:

(i) commit the incomplete transaction within the transaction processing system when the prediction from the categorizing indicates that all of the series of one or more transaction steps or operations which have completed in the source database have been replicated by the replication engine, and (ii) process any additional transaction steps or operations which have completed in the source database for the committed incomplete transaction as a new transaction applied to the target database, thereby fully processing the incomplete transaction within the transaction processing system.

10. The apparatus of claim 9 wherein one or more of the transactions patterns include one or more attributes which are used in the comparison.

11. The apparatus of claim 10 wherein one of the attributes is as process ID.

12. The apparatus of claim 9 wherein the incomplete transaction is incomplete in the target database.

13. The method of claim 1 wherein the information needed to recognize with a degree of confidence that the incomplete transaction has been observed before is obtained from a historical archive or a compiler.

14. The method of claim 1 wherein the information needed to recognize with a degree of confidence that the incomplete transaction has been observed before is obtained from a user of the transaction processing system.

15. The computer program product of claim 5 wherein the information needed to recognize with a degree of confidence that the incomplete transaction has been observed before is obtained from a historical archive or a compiler.

16. The computer program product of claim 5 Wherein the information needed to recognize with a degree of confidence that the incomplete transaction has been observed before is obtained from a user of the transaction processing system.

17. The apparatus of claim 9 wherein the information needed to recognize with a degree of confidence that the incomplete transaction has been observed before is obtained from a historical archive or a compiler.

18. The apparatus of claim 9 wherein the information needed to recognize with a degree of confidence that the incomplete transaction has been observed before is obtained from a user of the transaction processing system.

\* \* \* \* \*